US012532996B2

(12) United States Patent
Ohm

(10) Patent No.: US 12,532,996 B2
(45) Date of Patent: *Jan. 27, 2026

(54) MOBILE CLEANING ROBOT WITH ACTIVE SUSPENSION

(71) Applicant: iRobot Corporation, Bedford, MA (US)

(72) Inventor: Timothy R. Ohm, Grover Beach, CA (US)

(73) Assignee: iRobot Corporation, Bedford, MA (US)

(*) Notice: Subject to any disclaimer, the term of this patent is extended or adjusted under 35 U.S.C. 154(b) by 344 days.

This patent is subject to a terminal disclaimer.

(21) Appl. No.: 18/139,014

(22) Filed: Apr. 25, 2023

(65) Prior Publication Data

US 2024/0358209 A1 Oct. 31, 2024

(51) Int. Cl.
A47L 9/06 (2006.01)
A47L 9/00 (2006.01)
A47L 9/28 (2006.01)
A47L 11/40 (2006.01)

(52) U.S. Cl.
CPC ............ *A47L 9/009* (2013.01); *A47L 9/0673* (2013.01); *A47L 9/2852* (2013.01); *A47L 9/2873* (2013.01); *A47L 2201/028* (2013.01); *A47L 2201/06* (2013.01)

(58) Field of Classification Search
CPC .......... A47L 7/00; A47L 9/06; A47L 11/4044; A47L 11/40

See application file for complete search history.

(56) References Cited

U.S. PATENT DOCUMENTS

| 11,857,139 | B2 | 1/2024 | Ohm et al. | |
| 12,082,764 | B2* | 9/2024 | Ohm | A47L 11/4055 |
| 2008/0265490 | A1 | 10/2008 | Hendrix et al. | |
| 2020/0000302 | A1* | 1/2020 | Morin | A47L 11/4005 |
| 2020/0238836 | A1* | 7/2020 | Cheng | B60L 15/20 |
| 2022/0370160 | A1* | 11/2022 | Basafa | A61B 34/25 |
| 2023/0032691 | A1* | 2/2023 | Ohm | A47L 9/009 |

FOREIGN PATENT DOCUMENTS

| CN | 112847383 | 5/2021 |
| CN | 218832658 | 4/2023 |
| CN | 218943204 | 5/2023 |
| CN | 219206721 | 6/2023 |

(Continued)

OTHER PUBLICATIONS

"International Application Serial No. PCT US2022 036636, International Preliminary Report on Patentability mailed Feb. 8, 2024", 8 pgs.

(Continued)

*Primary Examiner* — Michael D Jennings
(74) *Attorney, Agent, or Firm* — Schwegman Lundberg & Woessner, P.A.

(57) ABSTRACT

A mobile cleaning robot an include a body, a drive wheel, a wheel stop, and an actuator system. The drive wheel can be connected to the body and can be operable to move the mobile cleaning robot about an environment. The wheel stop can be movable with respect to the body. The actuator system can be operable to move the wheel stop to engage the drive wheel to extend the drive wheel from the body.

20 Claims, 19 Drawing Sheets

(56) References Cited

FOREIGN PATENT DOCUMENTS

| CN | 219206722 | 6/2023 |
|----|-----------|--------|
| EP | 2433541 | 3/2012 |
| EP | 2476570 | 7/2012 |
| KR | 20040096253 | 11/2004 |
| KR | 20080028220 | 3/2008 |
| WO | 2019164261 | 8/2019 |
| WO | 2023009299 | 2/2023 |
| WO | 2024226142 | 10/2024 |

OTHER PUBLICATIONS

"International Application Serial No. PCT US2024 014753, International Search Report mailed Aug. 30, 2024", 6 pgs.
"International Application Serial No. PCT US2024 014753, Written Opinion mailed Aug. 30, 2024", 9 pgs.
"European Application Serial No. 22751209.2, Response filed Sep. 10, 2024 to Communication pursuant to Rules 161(1) and 162 EP", w claims, 10 pgs.
"U.S. Appl. No. 18/216,763, Non Final Office Action mailed Mar. 1, 2024", 16 pgs.
"U.S. Appl. No. 18/216,763, Response filed May 30, 2024 to Non Final Office Action mailed Mar. 1, 2024", 9 pgs.
"U.S. Appl. No. 18/216,763, Notice of Allowance mailed Jul. 1, 2024", 11 pgs.
"International Application Serial No. PCT US2024 014753, Invitation to Pay Additional Fees mailed Jul. 8, 2024", 4 pgs.
"U.S. Appl. No. 18/216,763, Corrected Notice of Allowability mailed Jul. 24, 2024", 2 pgs.
"International Application Serial No. PCT US2022 036636, International Search Report mailed Nov. 8, 2022", 4 pgs.
"International Application Serial No. PCT US2022 036636, Written Opinion mailed Nov. 8, 2022", 6 pgs.
"Chinese Application Serial No. 202221973157.9, Office Action mailed Dec. 19, 2022", w Concise Statement of Relevance, 3 pgs.
"Chinese Application Serial No. 202221973217.7, Office Action mailed Dec. 19, 2022", W Concise Statement of Relevance, 3 pg.
"U.S. Appl. No. 17/388,307, Non Final Office Action mailed Jan. 20, 2023", 16 pgs.
"English Translation of KR 20080028220A", (2008), 4 pgs.
"English Translation of CN 112847383A", (20121), 7 pgs.
"U.S. Appl. No. 17/388,307, Response filed Feb. 22, 2023 to Non Final Office Action mailed Jan. 20, 2023", 10 pgs.
"Chinese Application Serial No. 202221973144.1, Response filed Feb. 8, 2023 to Notification to Make Rectification mailed Nov. 23, 2022", w English Claims, 31 pgs.
"U.S. Appl. No. 17/388,307, Notice of Allowance mailed May 4, 2023", 12 pgs.
"International Application Serial No. PCT/US2024/014753, International Preliminary Report on Patentability mailed Nov. 6, 2025", 11 pgs.

\* cited by examiner

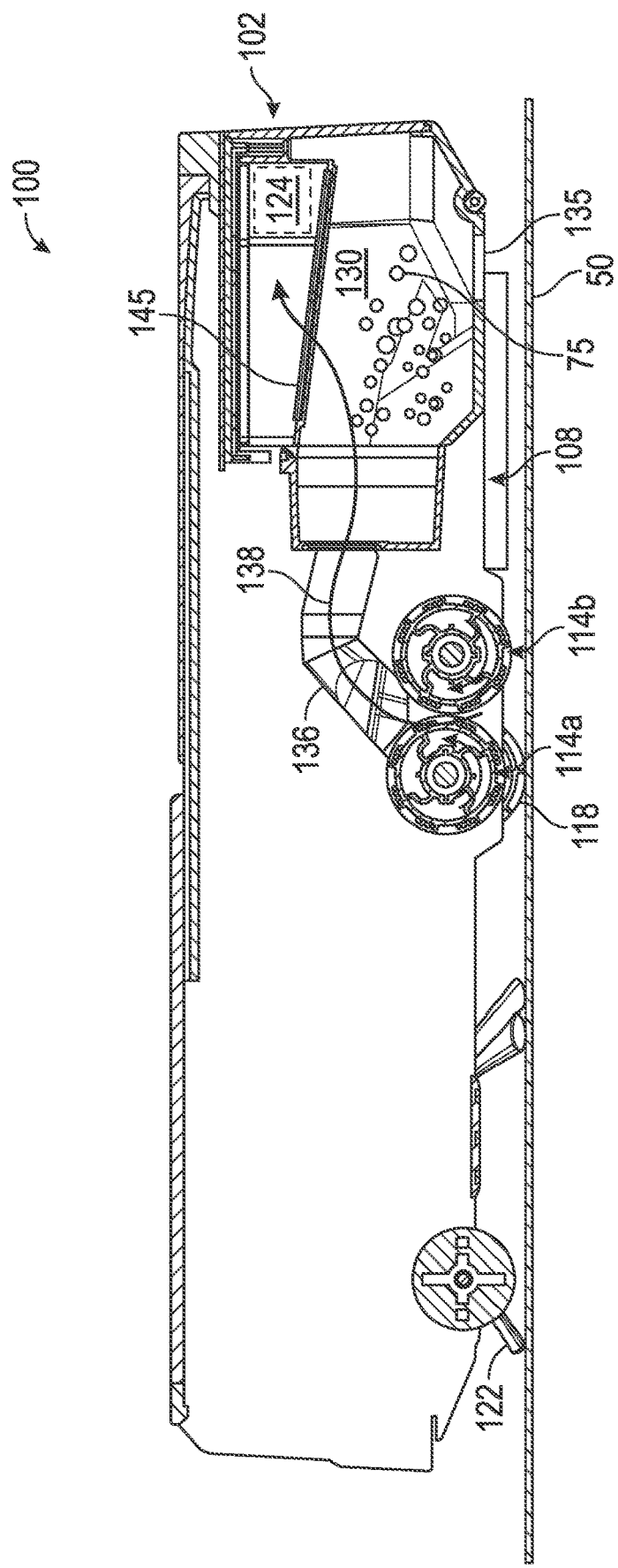

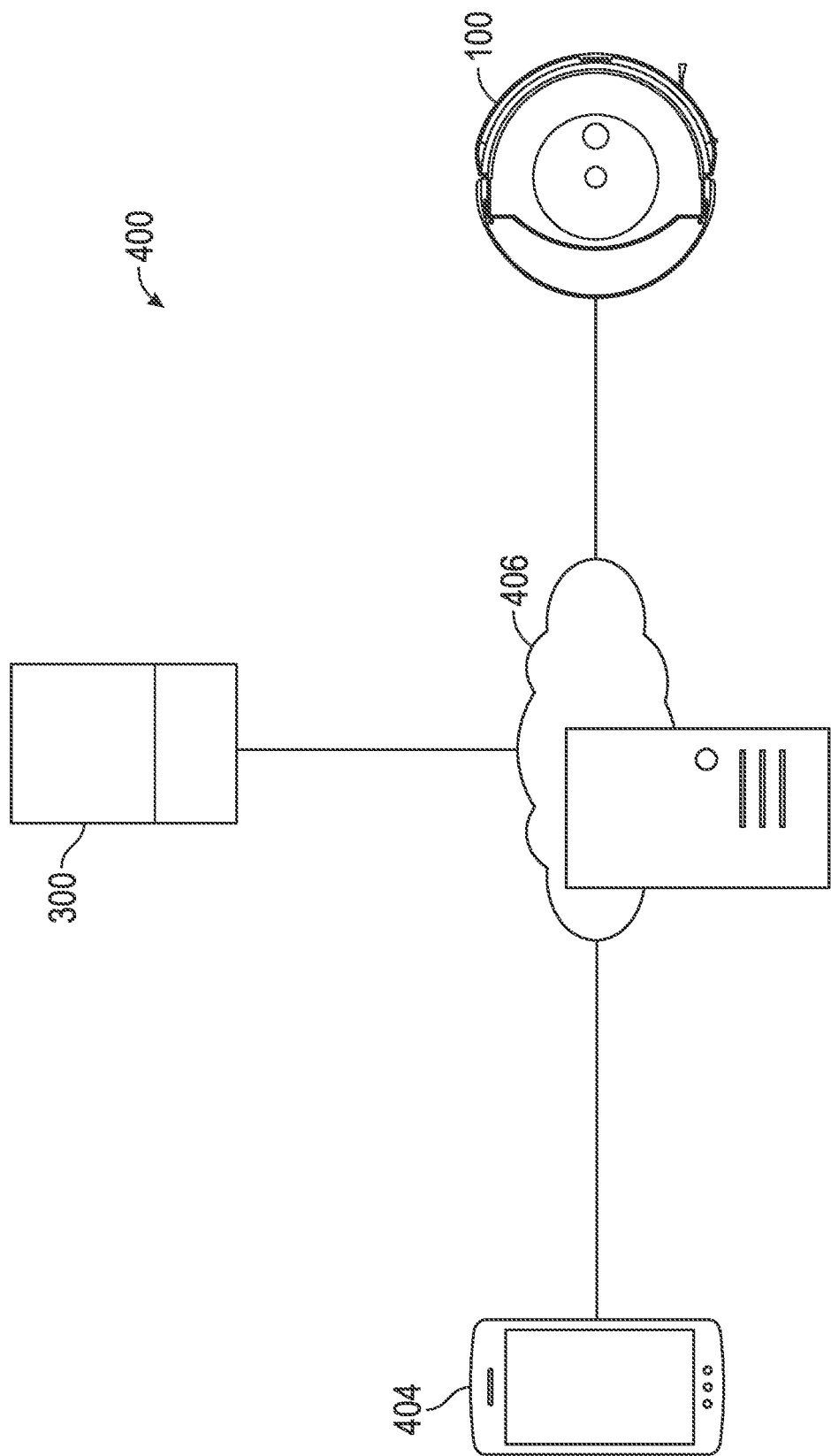

MOBILE CLEANING ROBOT WITH ACTIVE SUSPENSION

BACKGROUND

Autonomous mobile robots include autonomous mobile cleaning robots that can autonomously perform cleaning tasks within an environment, such as a home. Many kinds of cleaning robots are autonomous to some degree and in different ways. Some robots can perform vacuuming operations and some can perform mopping operations. Other robots can include components or systems to perform both vacuuming and mopping operations. Most types of mobile cleaning robots can interface with a docking station that can perform maintenance on the robot, such as charging and debris evacuation.

SUMMARY

Certain mobile cleaning robots can perform both mopping and vacuuming operations, where a cleaning pad can be added to the bottom of the mobile cleaning robot and pulled behind the vacuuming elements of the robotic vacuum. In such systems, it may be difficult to distribute an appropriate amount of weight on the cleaning pad and also provide adequate contact between the cleaning head and the floor. Additionally, it may be desirable to lift the cleaning pad off the floor surface to traverse a rug or other surface where it is not desirable to engage that surface with the cleaning pad. Further, it may be desirable to adjust the suspension when the robot is not mopping and is vacuuming carpet or a surface with a relatively high pile.

To help address the problems described above, this disclosure discusses solutions including an active suspension of the robot that is adjustable based on several factors, such as the operating mode (e.g., mopping mode or vacuuming mode) and the surface to be cleaned, helping to provide more reliable and better cleaning. For example, by adjusting the robot suspension during the mopping mode, a defined amount of weight can be placed upon the cleaning pad to allow for more effective cleaning. And when vacuuming, the suspension can be adjusted to improve contact between the ground and the cleaning head to provide improved debris pickup and can be adjusted to improve ride height relative to carpet pile.

The active suspension can also be used to help reduce slippage of the drive wheels of the mobile cleaning robot when the wheels encounter slick or wet surfaces, such as by adjusting the suspension to increase wheel downforce and therefore to increase traction. The active suspension can also be used to allow the robot to interact with a pickup and drop off dock that can interface with the robot to automatically connect a pad to the robot or disconnect a pad from the robot, helping to reduce user interactions with the robot.

For example, a mobile cleaning robot an include a body, a drive wheel, a wheel stop, and an actuator system. The drive wheel can be connected to the body and can be operable to move the mobile cleaning robot about an environment. The wheel stop can be movable with respect to the body. The actuator system can be operable to move the wheel stop to engage the drive wheel to extend the drive wheel from the body.

The above discussion is intended to provide an overview of subject matter of the present patent application. It is not intended to provide an exclusive or exhaustive explanation of the invention. The description below is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 2C illustrates a side cross-sectional view of a mobile cleaning robot.

FIG. 4 illustrates a diagram illustrating an example of a communication network in which a mobile cleaning robot operates and data transmission in the network.

DETAILED DESCRIPTION

Robot Operation Summary

Figure 1:
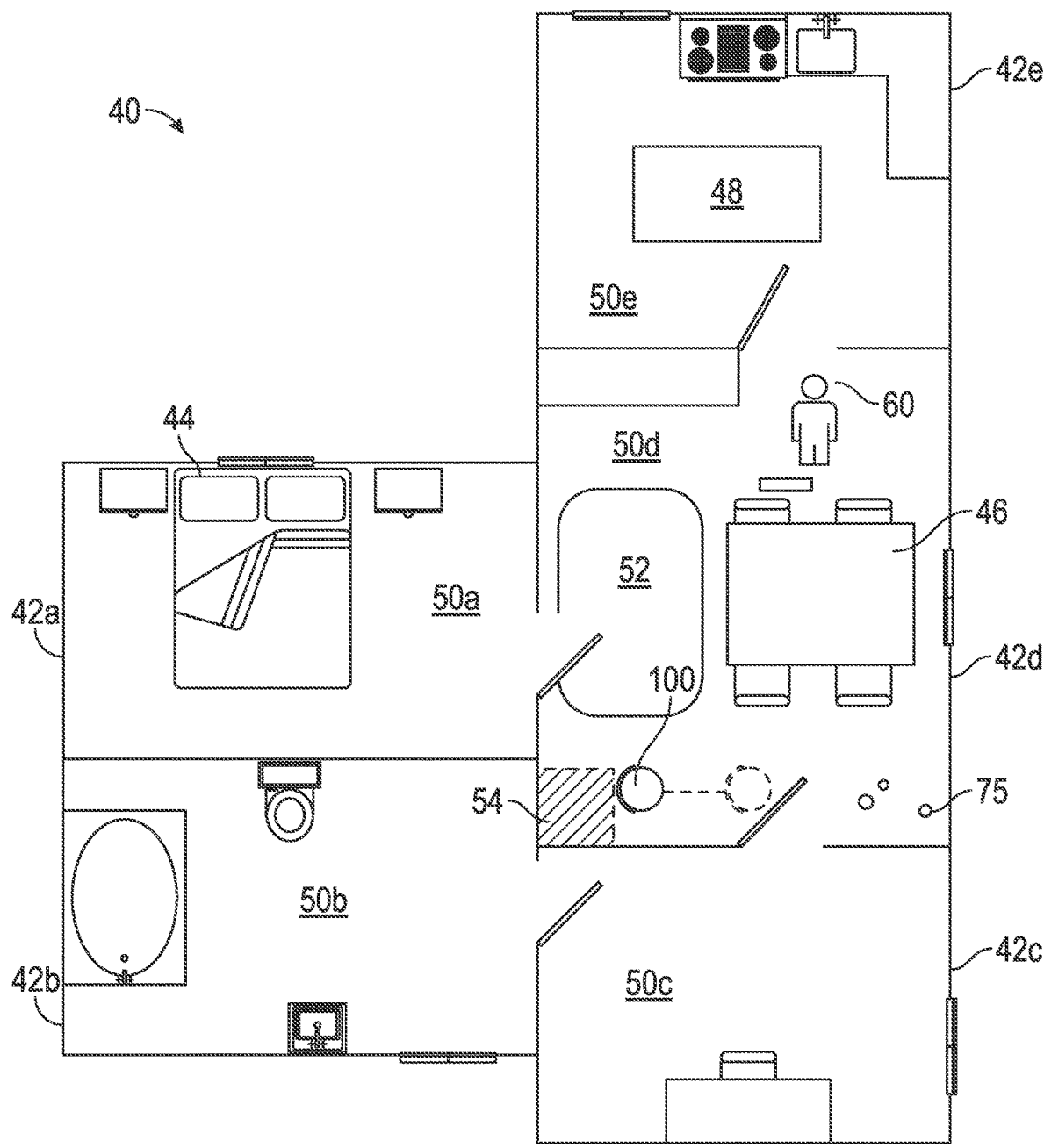
FIG. 1 illustrates a plan view of a mobile cleaning robot in an environment.

FIG. 1 illustrates a plan view of a mobile cleaning robot 100 in an environment 40, in accordance with at least one example of this disclosure. The environment 40 can be a dwelling, such as a home or an apartment, and can include rooms 42a-42e. Obstacles, such as a bed 44, a table 46, and an island 48 can be located in the rooms 42 of the environment. Each of the rooms 42a-42e can have a floor surface 50a-50e, respectively. Some rooms, such as the room 42d, can include a rug, such as a rug 52. The floor surfaces 50 can be of one or more types such as hardwood, ceramic, low-pile carpet, medium-pile carpet, long (or high)-pile carpet, stone, or the like.

The mobile cleaning robot 100 can be operated, such as by a user 60, to autonomously clean the environment 40 in a room-by-room fashion. In some examples, the robot 100 can clean the floor surface 50a of one room, such as the room 42a, before moving to the next room, such as the room 42d, to clean the surface of the room 42d. Different rooms can have different types of floor surfaces. For example, the room 42e (which can be a kitchen) can have a hard floor surface, such as wood or ceramic tile, and the room 42a (which can be a bedroom) can have a carpet surface, such as a medium pile carpet. Other rooms, such as the room 42d (which can be a dining room) can include multiple surfaces where the rug 52 is located within the room 42d.

During cleaning or traveling operations, the robot 100 can use data collected from various sensors (such as optical sensors) and calculations (such as odometry and obstacle detection) to develop a map of the environment 40. Once the map is created, the user 60 can define rooms or zones (such as the rooms 42) within the map. The map can be presentable to the user 60 on a user interface, such as a mobile device, where the user 60 can direct or change cleaning preferences, for example.

Also, during operation, the robot 100 can detect surface types within each of the rooms 42, which can be stored in the robot 100 or another device. The robot 100 can update the map (or data related thereto) such as to include or account for surface types of the floor surfaces 50a-50e of each of the respective rooms 42 of the environment 40. In some examples, the map can be updated to show the different surface types such as within each of the rooms 42.

In some examples, the user 60 can define a behavior control zone 54. In autonomous operation, the robot 100 can initiate a behavior in response to being in or near the behavior control zone 54. For example, the user 60 can define an area of the environment 40 that is prone to becoming dirty to be the behavior control zone 54. In response, the robot 100 can initiate a focused cleaning behavior in which the robot 100 performs a focused cleaning of a portion of the floor surface 50d in the behavior control zone 54.

Components of the Robot

Figure 2A:
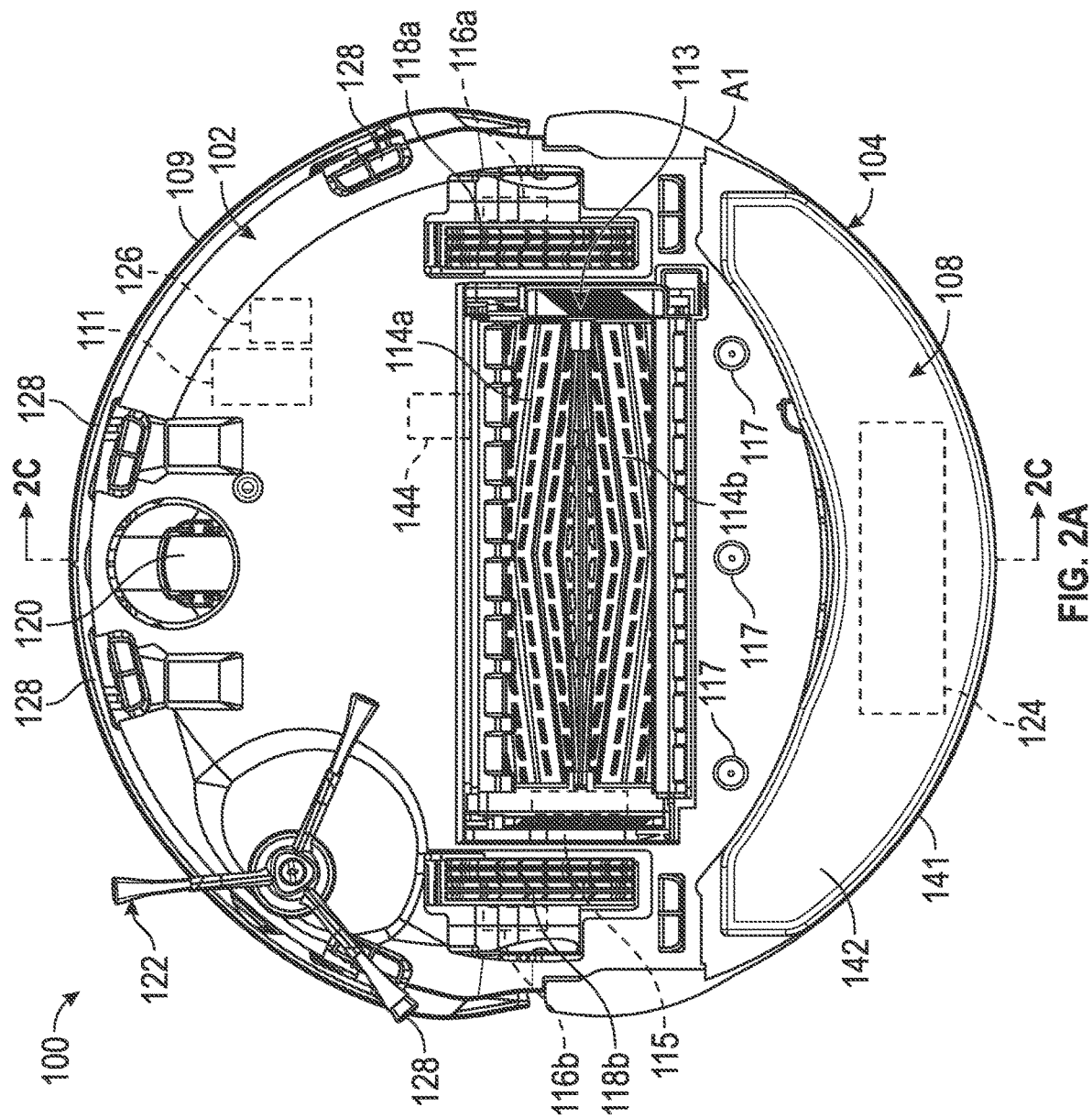
FIG. 2A illustrates a bottom view of a mobile cleaning robot.
Figure 2B:
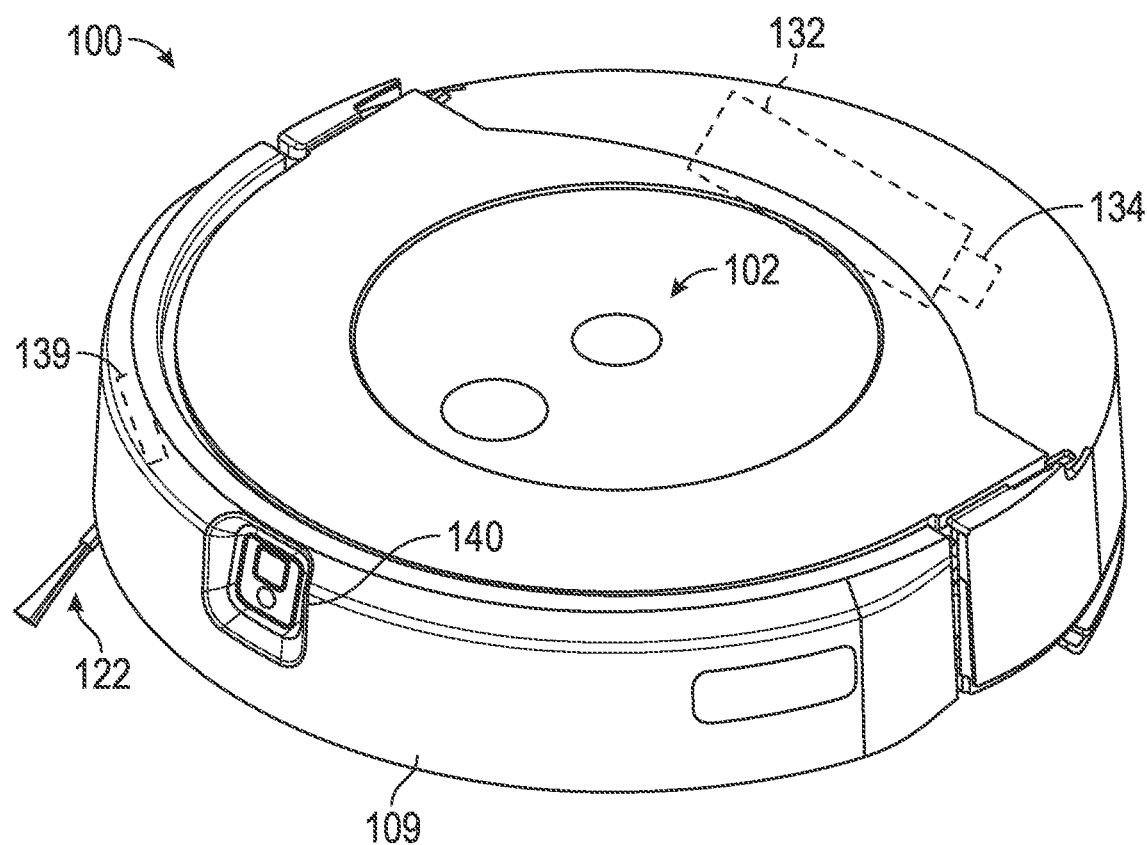
FIG. 2B illustrates a top isometric view of a mobile cleaning robot.

FIG. 2A illustrates a bottom view of the mobile cleaning robot 100 and FIG. 2B illustrates a top isometric view of the robot 100. FIGS. 2A and 2B are discussed together below. FIG. 2C illustrates a side cross-sectional view of a mobile cleaning robot across indicators 2C-2C of FIG. 2A. FIGS. 2A-2C are discussed together below.

FIG. 2A and 2B show that the robot 100 can include a body 102, a bumper 109, an extractor 113 (including rollers 114a and 114b), motors 116a and 116b, drive wheels 118a and 118b, a caster 120, a side brush assembly 122, a vacuum assembly 124, memory 126, and sensors 128. The robot 100 can also include a mopping system 104 that can include a tank 132 and a pump 134.

The cleaning robot 100 can be an autonomous cleaning robot that can autonomously traverse the floor surface 50 (of FIG. 1) while ingesting the debris from different parts of the floor surface 50. As shown in FIG. 2A, the robot 100 can include the body 102 that can be movable across the floor surface 50. The body 102 can include multiple connected structures to which movable or fixed components of the cleaning robot 100 can be mounted. The connected structures can include, for example, an outer housing (e.g., of the body 102) to cover internal components of the cleaning robot 100, a chassis (e.g., of the body 102) to which the drive wheels 118a and 118b and the cleaning rollers 114a and 114b (of the cleaning assembly 113) can be mounted, and the bumper 109 connected to the outer housing. The caster wheel 120 can support at least a front portion of the body 102 above the floor surface 50, and the drive wheels 118a and 118b can support at least middle and rear portions of the body 102 (and can also support a majority of the weight of the robot 100) above the floor surface 50.

As shown in FIG. 2A, the body 102 can include a front portion that can have a substantially semicircular shape and that can be connected to the bumper 109. The body 102 can also include a rear portion that has a substantially semicircular shape. In other examples, the body 102 can have other shapes such as a square front or straight front. The robot 100 can also include a drive system including the actuators (e.g., motors) 116a and 116b. The actuators 116a and 116b can be connected to the body 102 and can be operably connected to the drive wheels 118a and 118b, which can be rotatably mounted to the body 102. The actuators 116a and 116b, when driven, can rotate the drive wheels 118a and 118b to enable the robot 100 to autonomously move across the floor surface 50.

The vacuum assembly 124 can be located at least partially within the body 102 of the robot 100, such as in a rear portion of the body 102, and can be located in other locations in other examples. The vacuum assembly 124 can include a motor to drive an impeller that generates the airflow when rotated. The airflow and the cleaning rollers 114, when rotated, can cooperate to ingest the debris into the robot 100. The cleaning bin 130 (shown in FIG. 2C) can be mounted in the body 102 and can contain the debris ingested by the robot 100. A filter in the body 102 can separate the debris from the airflow before the airflow enters the vacuum assembly 124 and is exhausted out of the body 102. In this regard, the debris can be captured in both the cleaning bin 130 and the filter before the airflow is exhausted from the body 102. In some examples, the vacuum assembly 124 and extractor 113 can be optionally included or can be of a different type. Optionally, the vacuum assembly 124 can be operated during mopping operations, such as those including the mopping system 104. That is, the robot 100 can perform simultaneous vacuuming and mopping missions or operations.

The cleaning rollers 114a and 114b can be operably connected to an actuator 115, e.g., a motor, through a gearbox. The cleaning head 113 and the cleaning rollers 114a and 114b can be positioned forward of the cleaning bin 130. The cleaning rollers 114 can be mounted to an underside of the body 102 so that the cleaning rollers 114a and 114b engage debris on the floor surface 50 during the cleaning operation when the underside of the body 102 faces the floor surface 50.

The controller 111 can be located within the housing 102 and can be a programable controller, such as a single or multi-board computer, a direct digital controller (DDC), a programable logic controller (PLC), or the like. In other examples, the controller 111 can be any computing device, such as a handheld computer, for example, a smart phone, a tablet, a laptop, a desktop computer, or any other computing device including a processor, memory, and communication capabilities. The memory 126 can be one or more types of memory, such as volatile or non-volatile memory, read-only memory (ROM), random-access memory (RAM), magnetic disk storage media, optical storage media, flash-memory devices, and other storage devices and media. The memory 126 can be located within the housing 102, can be connected to the controller 111, and can be accessible by the controller 111.

The controller 111 can operate the actuators 116a and 116b to autonomously navigate the robot 100 about the floor surface 50 during a cleaning operation. The actuators 116a and 116b can be operable to drive the robot 100 in a forward drive direction, in a backwards direction, and to turn the robot 100. The controller 111 can operate the vacuum assembly 124 to generate an airflow that flows through an air gap near the cleaning rollers 114, through the body 102, and out of the body 102.

The robot 100 can include a sensor system including one or more sensors. The sensor system, as described herein, can generate one or more signal indicative of a current location of the robot 100, and can generate signals indicative of locations of the robot 100 as the robot 100 travels along the floor surface 50. The sensors 128 (shown in FIG. 2A) can be located along a bottom portion of the housing 102. Each of the sensors 128 can be an optical sensor that can be configured to detect a presence or absence of an object below the optical sensor, such as the floor surface 50. The sensors 128 (optionally cliff sensors) can be connected to the controller 111 and can be used by the controller 111 to navigate the robot 100 within the environment 40. In some examples, the cliff sensors can be used to detect a floor surface type which the controller 111 can use to selectively operate the mopping system 104.

The cleaning pad assembly 108 can be a cleaning pad connected to the bottom portion of the body 102 (or connected to a moving mechanism configured to move the assembly 108 between a stored position and a cleaning position), such as to the cleaning bin 130 in a location to the rear of the extractor 113. The tank 132 can be a water tank configured to store water or fluid, such as cleaning fluid, for delivery to a mopping pad 142. The pump 134 can be connected to the controller 111 and can be in fluid communication with the tank 132. The controller 111 can be configured to operate the pump 134 to deliver fluid to the mopping pad 142 during mopping operations. For example, fluid can be delivered through one or more dispensers 117 to the mopping pad 142. The dispenser(s) 117 can be a valve, opening, or the like and can be configured to deliver fluid to the floor surface 50 of the environment 40 or to the pad 142 directly. In some examples, the pad 142 can be a dry pad such as for dusting or dry debris removal. The pad 142 can also be any cloth, fabric, or the like configured for cleaning (either wet or dry) of a floor surface.

As shown in FIG. 2C, the vacuum assembly 124 can be located at least partially within the body 102 of the robot 100, e.g., in the rear portion 102b of the body 102. The controller 111 can operate the vacuum assembly 124 to generate an airflow that flows through the air gap near the cleaning rollers 114, through the body 102, and out of the body 102. The airflow and the cleaning rollers 114, when rotated, can cooperate to ingest debris 75 into a suction duct 136 of the robot 100. The suction duct 136 can extend down to or near a bottom portion of the body 102.

The suction duct 136 can be connected to the cleaning head 113 or cleaning assembly and can be connected to a cleaning bin 130. The cleaning bin 130 can be mounted in the body 102 and can contain the debris 75 ingested by the robot 100. A filter 145 can be located in the body 102, which can help to separate the debris 75 from the airflow before the airflow 138 enters the vacuum assembly 124 and is exhausted out of the body 102. In this regard, the debris 75 can be captured in both the cleaning bin 130 and the filter before the airflow 138 is exhausted from the body 102. The robot 100 can also include a debris port 135 that can extend at least partially through the body 102 or the cleaning bin 130 and can be operable to remove the debris 75 from the cleaning bin 130, such as via a docking station or evacuation station.

The cleaning rollers 114a and 114b can operably connected to one or more actuators 115, e.g., motors, respectively. The cleaning head 113 and the cleaning rollers 114a and 114b can be positioned forward of the cleaning bin 130. The cleaning rollers 114a and 114b can be mounted to a housing of the cleaning head 113 and mounted, e.g., indirectly or directly, to the body 102 of the robot 100. In particular, the cleaning rollers 114a and 114b can be mounted to an underside of the body 102 so that the cleaning rollers 114a and 114b engage debris 75 on the floor surface 50 during the cleaning operation when the underside faces the floor surface 50.

Operation of the Robot

In operation of some examples, the controller 111 can be used to instruct the robot 100 to perform a mission. In such a case, the controller 111 can operate the motors 116 to drive the drive wheels 118 and propel the robot 100 along the floor surface 50. The robot 100 can be propelled in a forward drive direction or a rearward drive direction. The robot 100 can also be propelled such that the robot 100 turns in place or turns while moving in the forward drive direction or the rearward drive direction. In addition, the controller 111 can operate the motors 115 to cause the rollers 114a and 114b to rotate, can operate the side brush assembly 122, and can operate the motor of the vacuum system 124 to generate airflow. The controller 111 can execute software stored on the memory 126 to cause the robot 100 to perform various navigational and cleaning behaviors by operating the various motors of the robot 100.

The various sensors of the robot 100 can be used to help the robot navigate and clean within the environment 40. For example, the cliff sensors can detect obstacles such as drop-offs and cliffs below portions of the robot 100 where the cliff sensors are disposed. The cliff sensors can transmit signals to the controller 111 so that the controller 111 can redirect the robot 100 based on signals from the sensors.

Proximity sensors can produce a signal based on a presence or the absence of an object in front of the optical sensor. For example, detectable objects include obstacles such as furniture, walls, persons, and other objects in the environment 40 of the robot 100. The proximity sensors can transmit signals to the controller 111 so that the controller 111 can redirect the robot 100 based on signals from the proximity sensors. In some examples, a bump sensor can be used to detect movement of the bumper 109 along a fore-aft axis of the robot 100. A bump sensor 139 can also be used to detect movement of the bumper 109 along one or more sides of the robot 100 and can optionally detect vertical bumper movement. The bump sensors 139 can transmit signals to the controller 111 so that the controller 111 can redirect the robot 100 based on signals from the bump sensors 139.

The robot 100 can also optionally include one or more dirt sensors 144 connected to the body 102 and in communication with the controller 111. The dirt sensors 144 can be a microphone, piezoelectric sensor, optical sensor, or the like located in or near a flow path of debris, such as near an opening of the cleaning rollers 114 or in one or more ducts within the body 102. This can allow the dirt sensor(s) 144 to detect how much dirt is being ingested by the vacuum assembly 124 (e.g., via the extractor 113) at any time during a cleaning mission. Because the robot 100 can be aware of its location, the robot 100 can keep a log or record of which areas or rooms of the map are dirtier or where more dirt is collected.

The image capture device 140 can be configured to generate a signal based on imagery of the environment 40 of the robot 100 as the robot 100 moves about the floor surface 50. The image capture device 140 can transmit such a signal to the controller 111. The controller 111 can use the signal or signals from the image capture device 140 for various tasks, algorithms, or the like, as discussed in further detail below.

In some examples, the obstacle following sensors can detect detectable objects, including obstacles such as furniture, walls, persons, and other objects in the environment of the robot 100. In some implementations, the sensor system can include an obstacle following sensor along the side surface, and the obstacle following sensor can detect the presence or the absence an object adjacent to the side surface. The one or more obstacle following sensors can also serve as obstacle detection sensors, similar to the proximity sensors described herein.

The robot 100 can also include sensors for tracking a distance travelled by the robot 100. For example, the sensor system can include encoders associated with the motors 116 for the drive wheels 118, and the encoders can track a distance that the robot 100 has travelled. In some implementations, the sensor can include an optical sensor facing downward toward a floor surface. The optical sensor can be positioned to direct light through a bottom surface of the robot 100 toward the floor surface 50. The optical sensor can detect reflections of the light and can detect a distance travelled by the robot 100 based on changes in floor features as the robot 100 travels along the floor surface 50.

The controller 111 can use data collected by the sensors of the sensor system to control navigational behaviors of the robot 100 during the mission. For example, the controller 111 can use the sensor data collected by obstacle detection sensors of the robot 100, (the cliff sensors, the proximity sensors, and the bump sensors) to enable the robot 100 to avoid obstacles within the environment of the robot 100 during the mission.

The sensor data can also be used by the controller 111 for simultaneous localization and mapping (SLAM) techniques in which the controller 111 extracts features of the environment represented by the sensor data and constructs a map of the floor surface 50 of the environment. The sensor data collected by the image capture device 140 can be used for techniques such as vision-based SLAM (VSLAM) in which the controller 111 extracts visual features corresponding to objects in the environment 40 and constructs the map using these visual features. As the controller 111 directs the robot 100 about the floor surface 50 during the mission, the controller 111 can use SLAM techniques to determine a location of the robot 100 within the map by detecting features represented in collected sensor data and comparing the features to previously stored features. The map formed from the sensor data can indicate locations of traversable and nontraversable space within the environment. For example, locations of obstacles can be indicated on the map as nontraversable space, and locations of open floor space can be indicated on the map as traversable space.

The sensor data collected by any of the sensors can be stored in the memory 126. In addition, other data generated for the SLAM techniques, including mapping data forming the map, can be stored in the memory 126. These data produced during the mission can include persistent data that are produced during the mission and that are usable during further missions. In addition to storing the software for causing the robot 100 to perform its behaviors, the memory 126 can store data resulting from processing of the sensor data for access by the controller 111. For example, the map can be a map that is usable and updateable by the controller 111 of the robot 100 from one mission to another mission to navigate the robot 100 about the floor surface 50.

The persistent data, including the persistent map, can help to enable the robot 100 to efficiently clean the floor surface 50. For example, the map can enable the controller 111 to direct the robot 100 toward open floor space and to avoid nontraversable space. In addition, for subsequent missions, the controller 111 can use the map to optimize paths taken during the missions to help plan navigation of the robot 100 through the environment 40.

The controller 111 can also send commands to a motor (internal to the body 102) to drive the arms 106 to move the pad assembly 108 between the stored position (shown in FIG. 2A) and the deployed position (shown in FIG. 2C). In the deployed position, the pad assembly 108 (the mopping pad 142) can be used to mop a floor surface of any room of the environment 40.

The mopping pad 142 can be a dry pad or a wet pad. Optionally, when the mopping pad 142 is a wet pad, the pump 134 can be operated by the controller 111 to spray or drop fluid (e.g., water or a cleaning solution) onto the floor surface 50 or the mopping pad 142. The wetted mopping pad 142 can then be used by the robot 100 to perform wet mopping operations on the floor surface 50 of the environment 40. As discussed in further detail below, the controller 111 can determine when to dispense fluid and when to move the pad tray 141 and the mopping pad 142 between the stored position and the cleaning position.

Docking Station and Robot Examples

Figure 3:
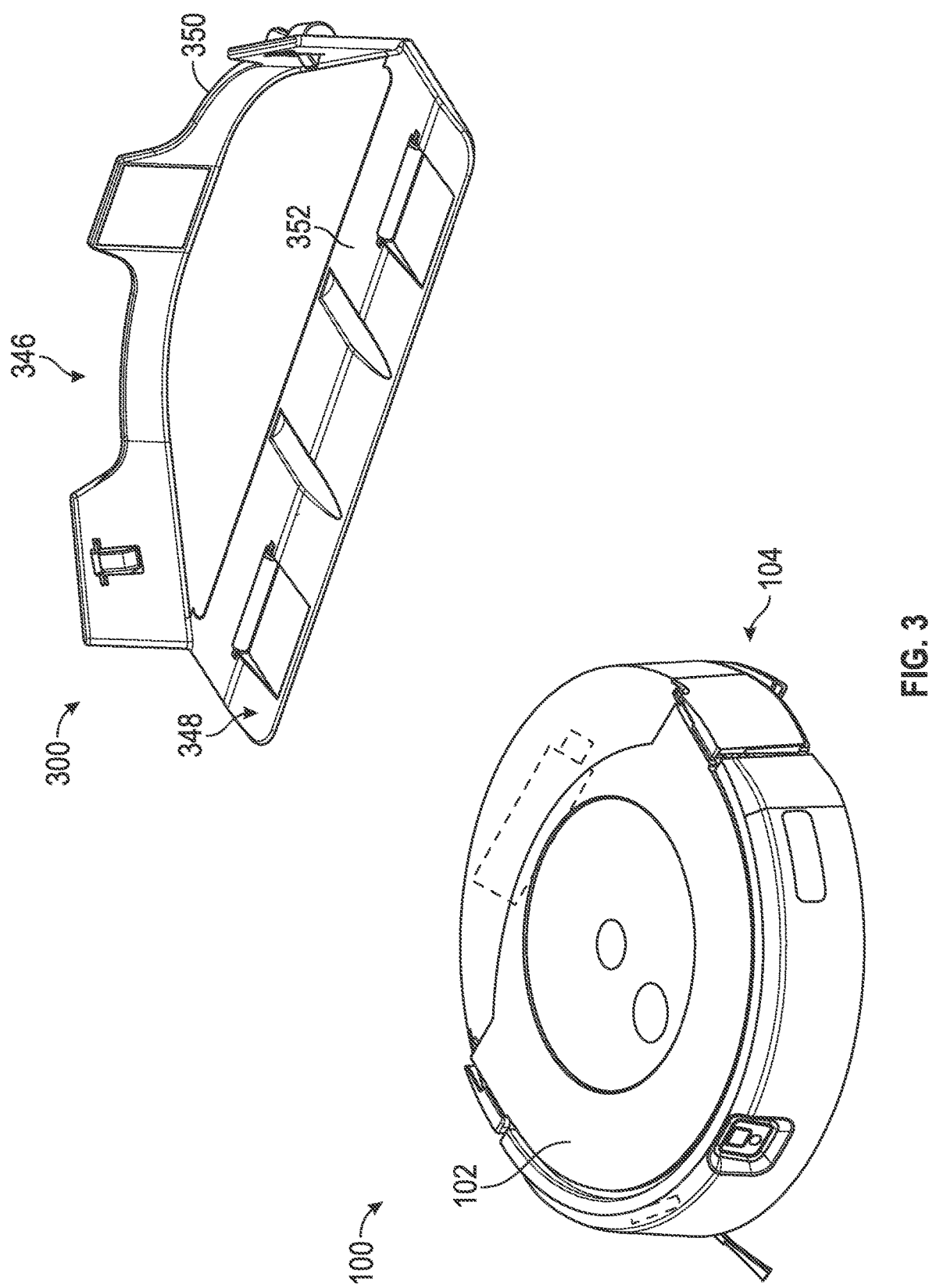
FIG. 3 illustrates an isometric view of a mobile cleaning robot and a docking station.

FIG. 3 illustrates an isometric view of the mobile cleaning robot 100 and a docking station 300. The docking station 300 can include an upper portion 346 and a base 348. The components of the docking station 300 can be rigid or semi-rigid components made of materials such as one or more of metals, plastics, foams, elastomers, ceramics, composites, combinations thereof, or the like. Materials of some components are discussed in further detail below. Though the docking station 300 (or other docking stations discussed below) are discussed as working with the robot 100, the docking station 300 (or other docking stations discussed below) can work with vacuuming only robots or any mobile cleaning robot that collects debris.

The upper portion 346 can include an outer wall 350 (or wall) connected to the base. The base 348 can include a platform 352 including include tracks. The base 348 can be a ramped member including the platform 352, where the base 348 can be configured to receive the mobile cleaning robot 100 thereon for maintenance, such as replacement of a mopping pad of the mopping system 104. For example, the mobile cleaning robot 100 can move onto the base 348 by traversing the platform 352. The docking station 300 can optionally include a controller (e.g., similar to the controller 111), such as for communicating with the robot 100 or other device.

In operation of some examples, when the robot 100 is docked on the base 348, the robot 100 can be operated to release a mopping pad from the mopping system 104 or can be operated to collect or attach a mopping pad to the mopping system 104. Further details of the robot 100 and the docking station 300 and operation thereof are discussed below.

Network Examples

FIG. 4 is a diagram showing a communication network 400 that enables networking between the mobile robot 100 and one or more other devices, a docking station 300 (or any of the docking stations discussed herein), a mobile device 404 (including a controller), a cloud computing system 406 (including a controller), or another autonomous robot separate from the mobile robot 100. Using the communication network 400, the robot 100, the mobile device 404, the docking station 300, and the cloud computing system 406 can communicate with one another to transmit and receive data from one another. In some examples, the robot 100, the docking station 300, or both the robot 100 and the docking station 300 can communicate with the mobile device 404 through the cloud computing system 406. Alternatively, or additionally, the robot 100, the docking station 300, or both the robot 100 and the docking station 300 can communicate directly with the mobile device 404. Various types and combinations of wireless networks (e.g., Bluetooth, radio frequency, optical based, etc.) and network architectures (e.g., wi-fi or mesh networks) can be employed by the communication network 400.

In some examples, the mobile device 404 can be a remote device that can be linked to the cloud computing system 406 and can enable a user to provide inputs. The mobile device 404 can include user input elements such as, for example, one or more of a touchscreen display, buttons, a microphone, a mouse, a keyboard, or other devices that respond to inputs provided by the user. The mobile device 404 can also include immersive media (e.g., virtual reality or augmented reality) with which the user can interact to provide input. The mobile device 404, in these examples, can be a virtual reality headset or a head-mounted display.

The user can provide inputs corresponding to commands for the mobile robot 100. In such cases, the mobile device 404 can transmit a signal to the cloud computing system 406 to cause the cloud computing system 406 to transmit a command signal to the mobile robot 100. In some implementations, the mobile device 404 can present augmented reality images. In some implementations, the mobile device 404 can be a smart phone, a laptop computer, a tablet computing device, or other mobile device.

In some examples, the communication network 400 can include additional nodes. For example, nodes of the communication network 400 can include additional robots. Also, nodes of the communication network 400 can include network-connected devices that can generate information about the environment 40. Such a network-connected device can include one or more sensors, such as an acoustic sensor, an image capture system, or other sensor generating signals, to detect characteristics of the environment 40 from which features can be extracted. Network-connected devices can also include home cameras, smart sensors, or the like.

In the communication network 400, the wireless links can utilize various communication schemes, protocols, etc., such as, for example, Bluetooth classes, Wi-Fi, Bluetooth-low-energy, also known as BLE, 802.15.4, Worldwide Interoperability for Microwave Access (WiMAX), an infrared channel, satellite band, or the like. In some examples, wireless links can include any cellular network standards used to communicate among mobile devices, including, but not limited to, standards that qualify as 1G, 2G, 3G, 4G, 5G, or the like. The network standards, if utilized, qualify as, for example, one or more generations of mobile telecommunication standards by fulfilling a specification or standards such as the specifications maintained by International Telecommunication Union. For example, the 4G standards can correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards can use various channel access methods, e.g., FDMA, TDMA, CDMA, or SDMA.

Robot Examples

Figure 5A:
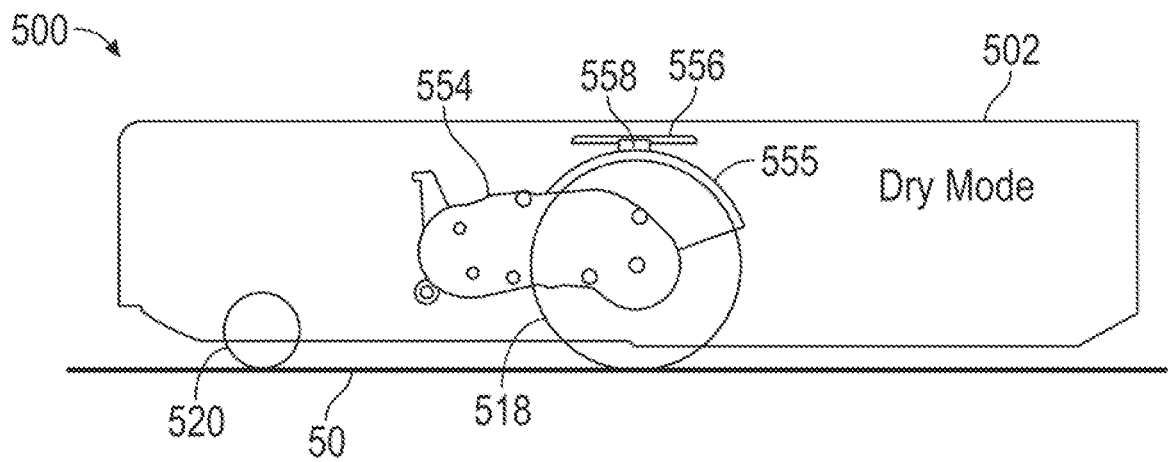
FIG. 5A illustrates a schematic view of a mobile cleaning robot in a first condition.
Figure 5B:
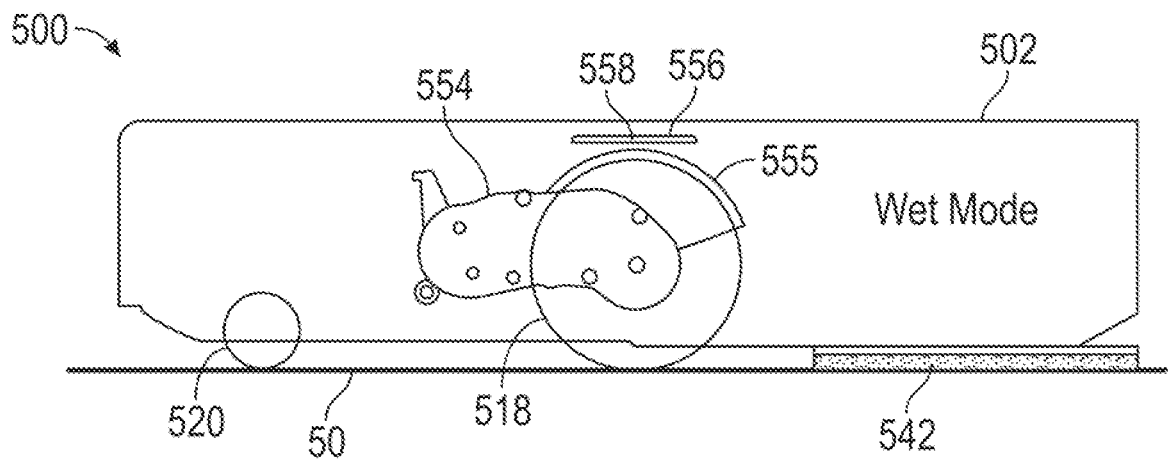
FIG. 5B illustrates a schematic view of a mobile cleaning robot in a second condition.
Figure 5C:
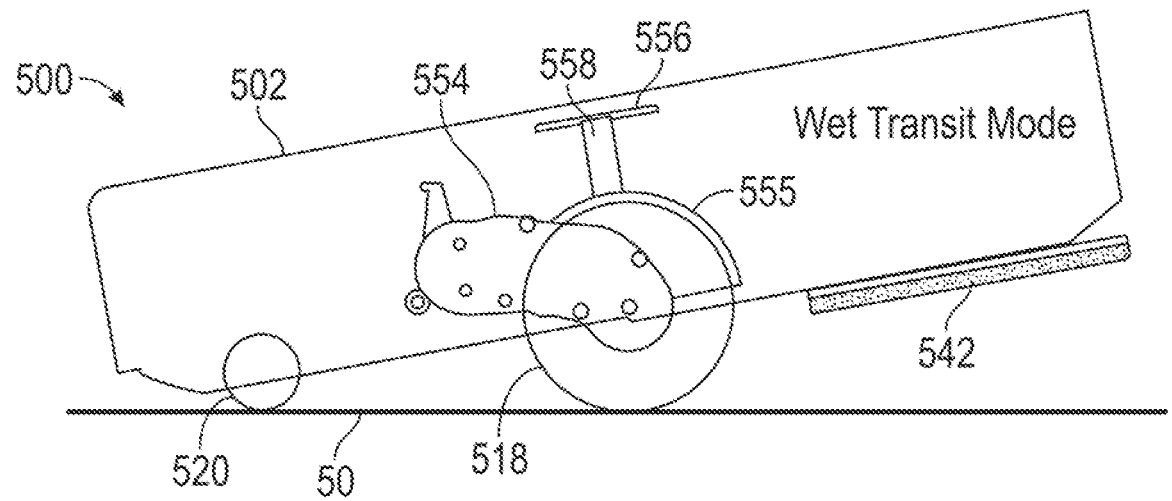
FIG. 5C illustrates a schematic view of a mobile cleaning robot in a third condition.

FIG. 5A illustrates a schematic view of a mobile cleaning robot 500 in a first condition. FIG. 5B illustrates a schematic view of the mobile cleaning robot 500 in a second condition. FIG. 5C illustrates a schematic view of the mobile cleaning robot 500 in a third condition. FIGS. 5A-5C are discussed together below. The mobile cleaning robot 500 can be similar to the robot 100 discussed above; any of the mobile cleaning robots discussed above can include the features of the mobile cleaning robot 500.

The mobile cleaning robot 500 can include a body 502 and drive wheel 518 connected to the body 502 by a drive arm 554. The mobile cleaning robot 500 can also include a caster 520. The drive wheel 518 and the caster 520 can together be configured to engage the floor surface 50 to move the mobile cleaning robot 500 about an environment (e.g., the environment 40) and can be configured to support the mobile cleaning robot 500. The body 502, the drive wheel 518, and the caster 520 can be similar to body 102, the drive wheels 118, and the caster 120, respectively, of the robot 100 discussed above.

The drive arm 554 can be movable with respect to the body 502 such as to allow the drive wheel 518 to move (e.g., extend and retract) with respect to the body 502. The drive arm 554 can also be connected to a spring or biasing elements to bias the drive wheel 518 to extend from the body 502. The drive arm 554 can optionally include a gear train therein. The body 502 can also include a fender 555 or wheel guard connected to the drive arm 554 or the drive wheel 518 such that the fender 555 can at least partially surround the drive wheel 518. The fender 555 can be movable with the drive arm 554 and the drive wheel 518.

The mobile cleaning robot 500 can also include a stop support 556 and a wheel stop 558. The stop support 556 can be connected to the body and can be configured to support the wheel stop 558. The movable wheel stop 558 can be connected to the stop support 556 and can be engageable with the fender 555. Optionally, the wheel stop 558 can engage other portions of the mobile cleaning robot 500 such as the drive arm 554, so long as the wheel stop 558 can limit movement of the drive arm 554 relative to the body 502. The wheel stop 558 can be connected to one or more actuators (as discussed below) and can be in communication with a controller (e.g., the controller 111) such that the controller can operate the actuator or the wheel stop 558 to move with respect to the body 502 and the fender 555 (and therefore the drive arm 554 and the drive wheel 518).

FIGS. 5B and 5C also show that the mobile cleaning robot 500 can include a mopping pad 542, such as of a mopping pad assembly, which can be similar to the mopping pad 142, such that the mopping pad 542 can be engageable with the floor surface 50 to perform wet or dry mopping operations thereon. The mopping pad 542 can be movable with a pad assembly or can be releasably connectable to the body 502 of the mobile cleaning robot 500.

In operation, as shown in FIG. 5A, the wheel stop 558 can be in a first condition or position where the robot 500 is in a dry mode configuration, such as a vacuuming mode. In such a condition, a clearance between the body 502 and the floor can be optimized for vacuuming performance. Also, a distribution of weight to the caster 520, the drive wheel 518, and the cleaning head can be optimized or set for effective vacuuming operations or robot mobility.

As shown in FIG. 5B, the wheel stop 558 can be in a second condition or position where the robot 500 is in a wet mode configuration, such as a mopping mode or both mopping and vacuuming mode. In the second condition, the wheel stop 558 can be retracted further from the condition of FIG. 5A to allow the fender 555 and the drive wheel 518 to retract further (relative to the condition of FIG. 5A) into the body 502. That is, the drive wheel 518 is free to have a greater travel (or float) with respect to the body 502, as necessary to comply with the flooring surface. In such a condition, a clearance between the body 502 and the floor can be optimized for mopping or vacuuming and mopping. Also, a distribution of weight to the caster 520, the drive wheel 518, and the mopping pad 542 (e.g., additional robot weight applied to the mopping pad 542) can be optimized or set for effective mopping operations, vacuuming and mopping operations, or robot mobility.

As shown in FIG. 5C, the wheel stop 558 can be in a third condition or position where the robot 500 is in a transit or mobility mode or configuration. In the third condition, the wheel stop 558 can be extended further from the condition of FIG. 5A to allow the fender 555 and the drive wheel 518 to extend further (relative to the condition of FIG. 5A) out of the body 502. In such a condition, a clearance between the body 502 (especially the mopping pad 542) and the floor can be increased for mobility, which can allow the robot 100 to carry the mopping pad 542 over a fibrous floor surface, such as carpet. The robot 100 (or a controller thereof) can operate the wheel stop 558 between the various modes throughout a cleaning to improve mobility and cleaning efficiency or effectiveness.

Figure 6:
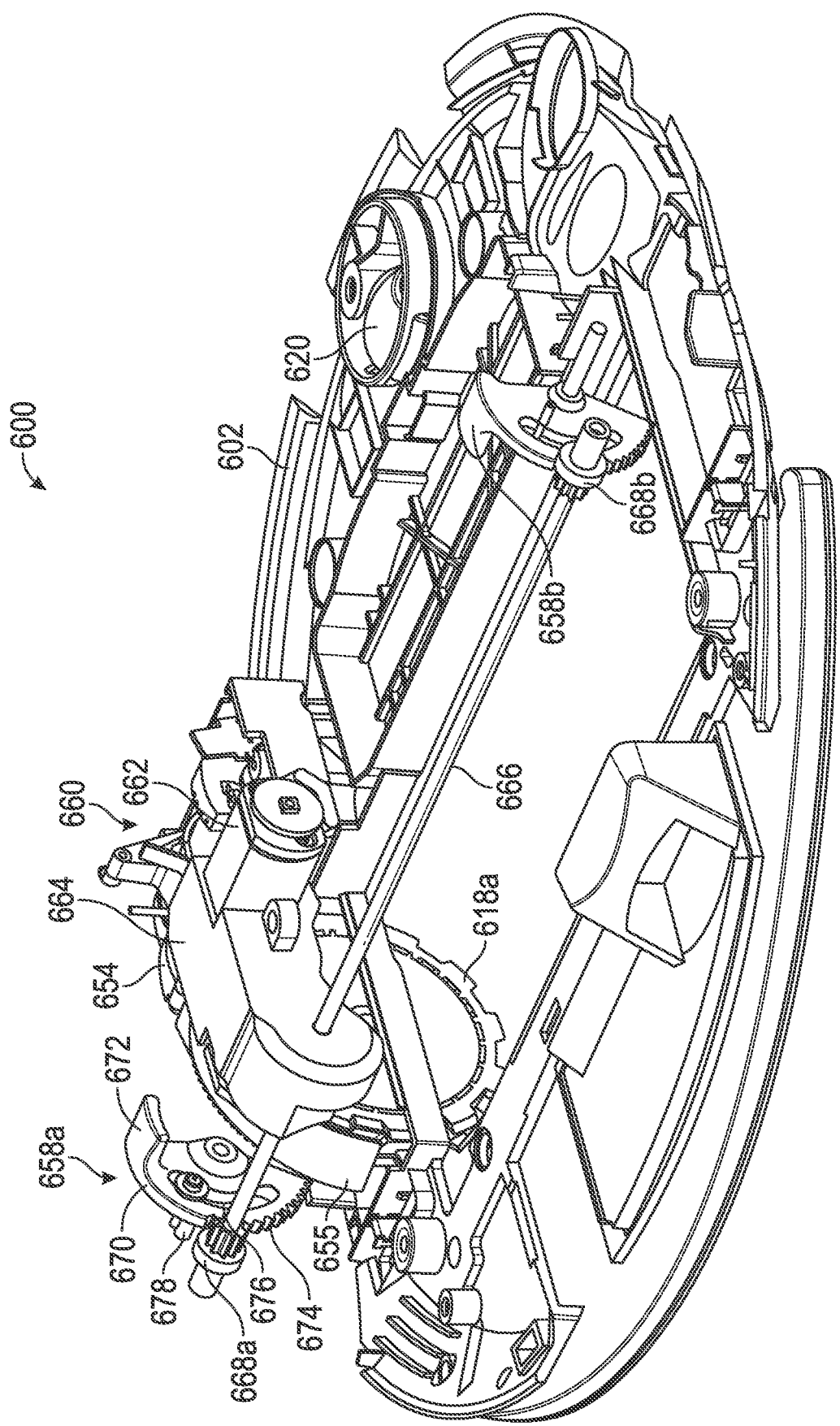
FIG. 6 illustrates an isometric view of a portion of a mobile cleaning robot.
Figure 7:
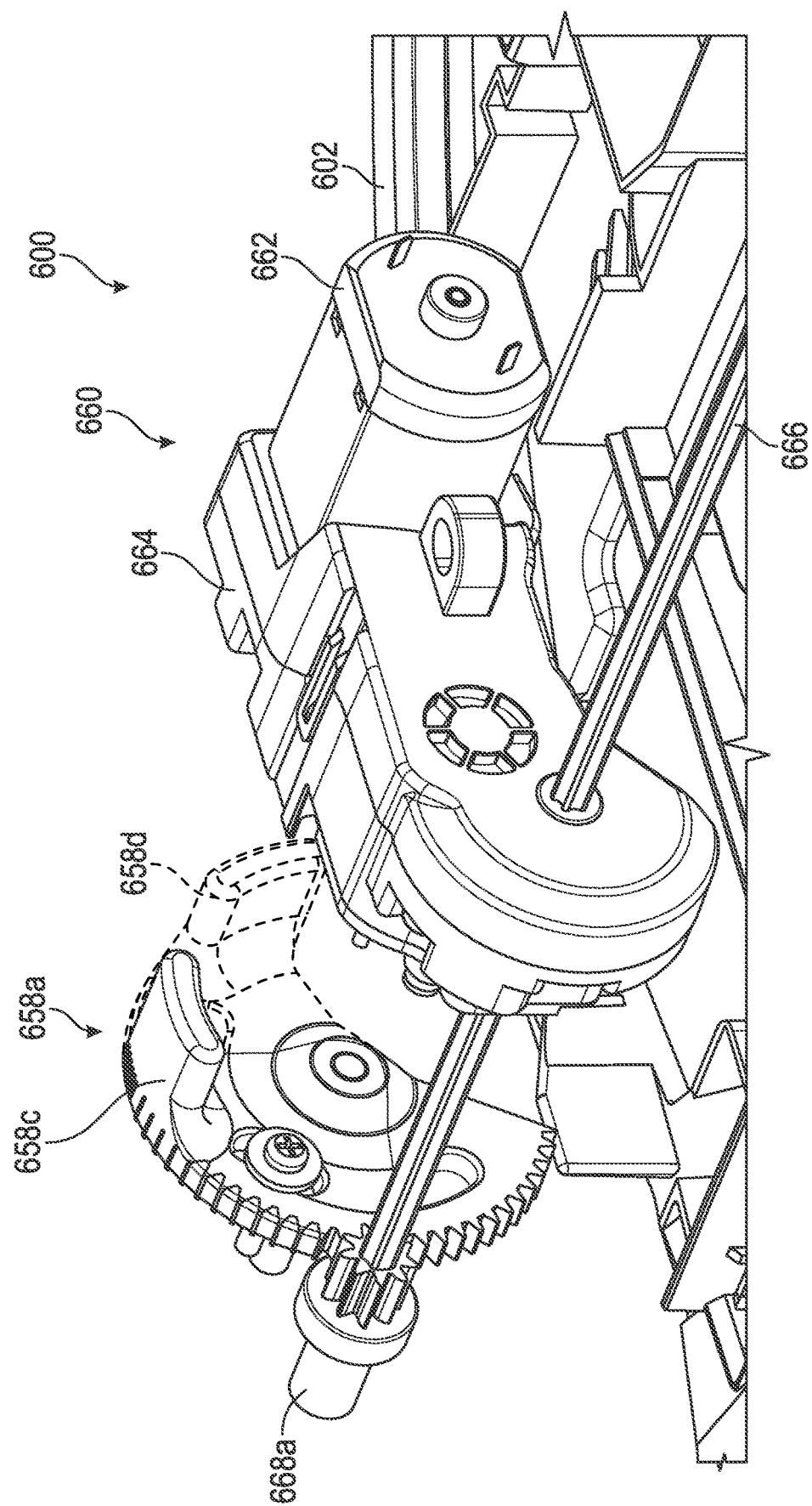
FIG. 7 illustrates an isometric view of a portion of a mobile cleaning robot.
Figure 8:
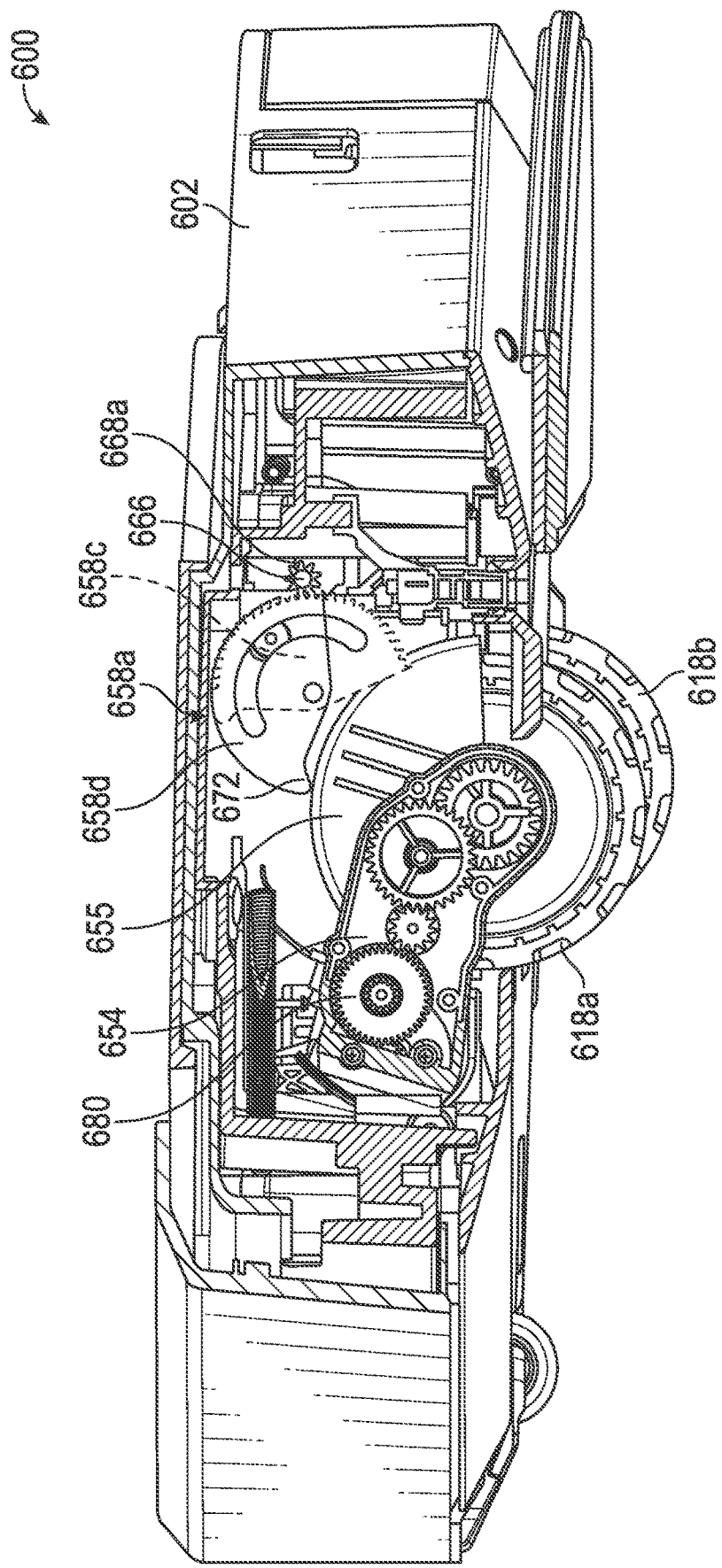
FIG. 8 illustrates an isometric view of a portion of a mobile cleaning robot.
Figure 9:
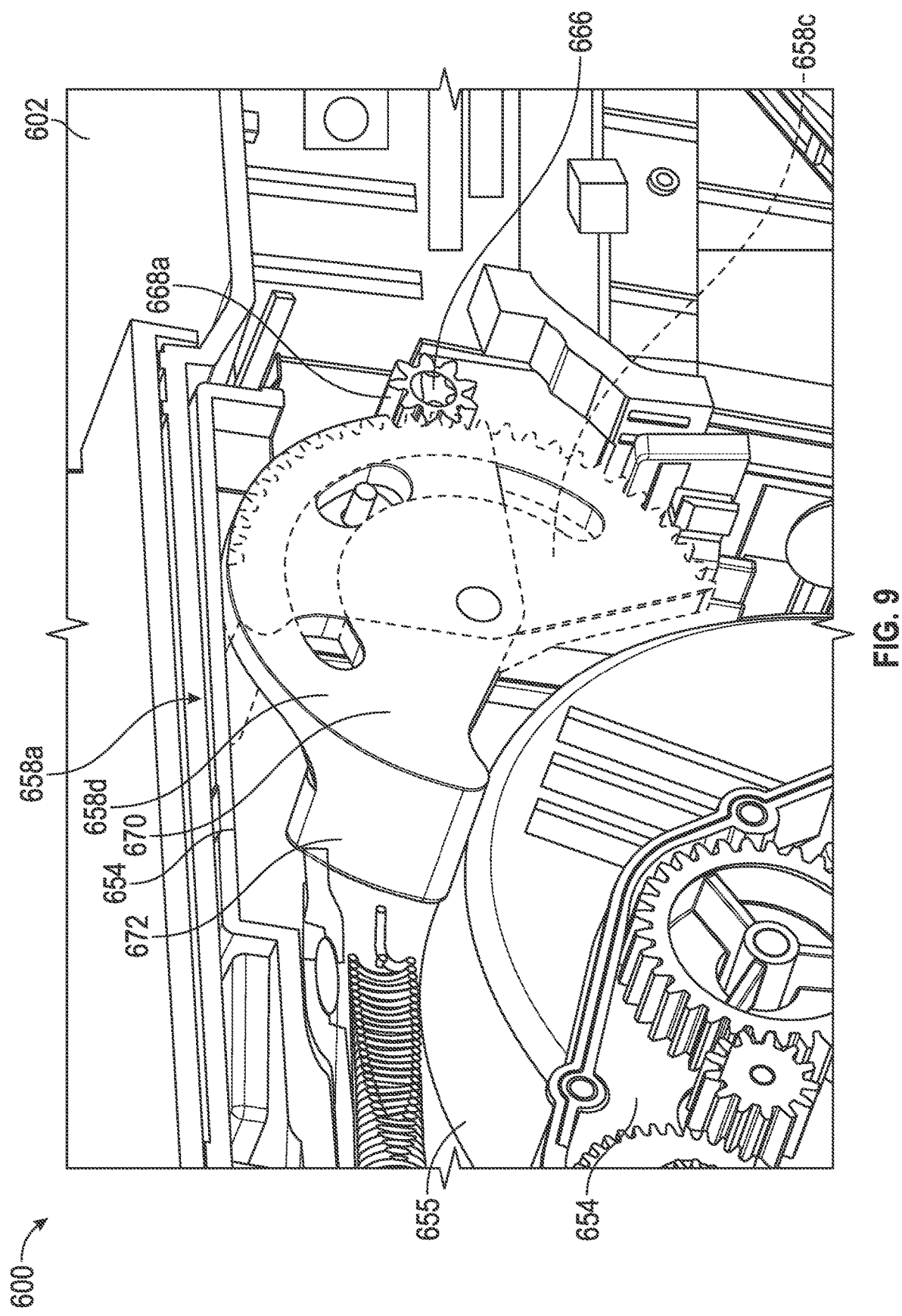
FIG. 9 illustrates an isometric view of a portion of a mobile cleaning robot.

FIG. 6 illustrates an isometric view of a portion of a mobile cleaning robot 600. FIG. 7 illustrates an isometric view of a portion of the mobile cleaning robot 600. FIG. 8 illustrates an isometric view of a portion of the mobile cleaning robot 600. FIG. 9 illustrates an isometric view of a portion of the mobile cleaning robot 600. FIGS. 6-9 are discussed together below. The mobile cleaning robot 600 can be similar to the robots 100 or 500 discussed above; any of the mobile cleaning robots discussed above can include the features of the mobile cleaning robot 600.

The mobile cleaning robot 600 can include a body 602 and drive wheel 618 connected to the body 602 by a drive arm 654. The mobile cleaning robot 600 can also include a caster 620. The drive wheel 618 and the caster 620 can together be configured to engage a floor surface to move the mobile cleaning robot 600 about an environment (e.g., the environment 40) and can be configured to support the mobile cleaning robot 600. The body 602, the drive wheel 618, and the caster 620 can be similar to body 102, the drive wheels 118, and the caster 120, respectively, of the robot 100 discussed above.

The drive arm 654 and drive wheel 618 can be movable with respect to the body 602 such as to allow the drive wheel 618 to move (e.g., extend and retract) with respect to the body 602. The drive arm 654 can optionally include a gear train therein. The body 602 can also include a fender 655 or wheel guard connected to the drive arm 654 or the drive wheel 618 such that the fender 655 at least partially surrounds the drive wheel 618. The fender 655 can be movable with the drive arm 654 and the drive wheel 618.

FIG. 6 also shows that the mobile cleaning robot 600 can include an actuator system 660 operable to move wheel stops 658a and 658b to engage the drive wheels 618a and 618b (only drive wheel 618a is shown in FIG. 6), respectively, to extend the drive wheels 618 from the body 602. For example, the actuator system 660 can be operable to rotate the wheel stop 658 with respect to the body 602, such as to change a mode of the mobile cleaning robot between a vacuuming mode and a mopping mode (or other modes).

More specifically, the actuator system 660 can include an actuator 662, a gear box 664, a drive shaft 666, and actuator gears 668a and 668b. The actuator system 660 can also include an encoder (e.g., absolute encoder) or other sensor that can be connected to (or in communication with) a controller (e.g., the controller 111). The encoder can be configured to generate a position signal based on a position of one or more components of the actuator system 660 to allow the controller to determine a position of the wheel stops 658, which can be used by the controller 111 to change between modes or set a desire force distribution of the mobile cleaning robot 600.

The actuator gears 668 can be connected to respective ends or end portions of the drive shaft 666 and the actuator gears 668a and 668b can be engaged with wheel stops 658a and 658b, respectively. The drive shaft 666 can be a shaft or elongate member extending across the body 602. The drive shaft 666 can be connected to our coupled with the gear box 664. The gear box 664 can be a gear box or housing including one or more gears connected to the actuator 662. The actuator 662 and the gear box 664 can be connected to or supported by the body 602.

The actuator 662 can be a motor or actuator operable to rotate gears of the gear box 664 to rotate the drive shaft 666 and the actuator gears 668 to drive the wheel stops 658 to move or rotate. The actuator 662 can be connected to or in communication with a controller (e.g., the controller 111) such that the controller can operate the actuator 662 to move the wheel stops 658, such as based on one or more signals from a sensor system, e.g., the sensor system of the robot 100. For example, the controller can be configured to determine a flooring type of a portion of the environment (e.g., the environment 40) based on the image capture signal, and the controller can be configured to operate the actuator system 660 based on the determined flooring type to move the drive wheel 618 to improve cleaning efficiency or mobility of the mobile cleaning robot 600.

FIG. 6 also shows that the wheel stops 658 can each include a body 670 rotatable with the actuator system 660, such as with the actuator gear 668 and the actuator system 660. The wheel stops 658 can also include a projection 672 extending laterally inward from the body 670, where the projection 672 can be engageable with the fender 655. The body 670 can also include one or more teeth 674 on an outer surface thereof, where the one or more teeth 674 can be engaged or engageable with teeth of the actuator gear 668. The body 670 can also define a slot 676 extending at least partially through the body 670. The slot 676 can receive a pin 678 at least partially therein. The pin 678 can be connected to the body 602 and can be engageable with ends of the slot 676 such as to guide and limit rotation of the wheel stops 658 with respect to the body 602.

FIG. 7 shows the wheel stop 658a in two configurations. The first configuration is in a raised configuration where the fender 655 (not visible in FIG. 7) will not contact the wheel stop 658a, as indicated by 658c, such that the fender 655 and the drive wheel 618a (not visible in FIG. 7) are free to move through their full range, which can be similar to the configuration shown in FIG. 5B. The second configuration of the wheel stop 658a is a lowered configuration where the fender 655 will contact the wheel stop 658a, as indicated by 658d in broken lines, such that the travel of the drive wheel 618a is most limited by the wheel stop 658a, which can be similar to the configuration shown in FIG. 5C. The wheel stop 658a can be movable to any position between the two shown configurations and optionally can be movable outside of the two shown configurations as limited by contact between the pin 678 and the slot 676 as discussed above.

FIGS. 8 and 9 show the wheel stop 658a in multiple configurations. In the configuration shown by 658d (in solid lines), the projection 672 of the wheel stop 658a can engage the fender 655 to move the drive arm 654 and the drive wheel 618a to extend from the body 602 or to limit retraction of the drive wheel 618a into the body 602. In the configuration shown by 658c (in dashed lines), the wheel stop 658a can be disengaged from the fender to allow the drive arm 654 and the drive wheel 618a to retract into the body 602.

FIGS. 8 and 9 also show a gear train 680 of the drive arm 654, which can be operable to rotate the drive wheel 618a. FIG. 9 also shows, more clearly, how the projection 672 can extend laterally inward from the body 670 such that the projection 672 can be engageable with the fender 655 and such that the body 670 can rotate or move without engaging the fender 655.

The above examples of robots (e.g., the mobile cleaning robot 500 and the mobile cleaning robot 600) allow for the adjustable suspension to recover from wheel slip events, or events where the robot detects that it is not moving as it should in consideration of drive wheel movement. In such a situation, the robot can use the active suspension to push down on the drive wheels (to increase a downward force) to help regain traction, such as when traction is lost due to vacuuming high pile carpeting (when drag is high on the robot) or when mopping wet floors (such as when friction is low from slippery flooring surfaces).

The above robots also can also help to prevent or correct sinking of the robot into relatively high pile carpeting. In such a situation, when the robot sinks or begins to sink, the adjustable suspension can cause the drive wheels to extend from the body, lifting a body of the robot relatively higher, to reduce cleaning head engagement and to help reduce ingestion of carpet fiber ingestion or engagement.

Docking Station Examples

Figure 10:
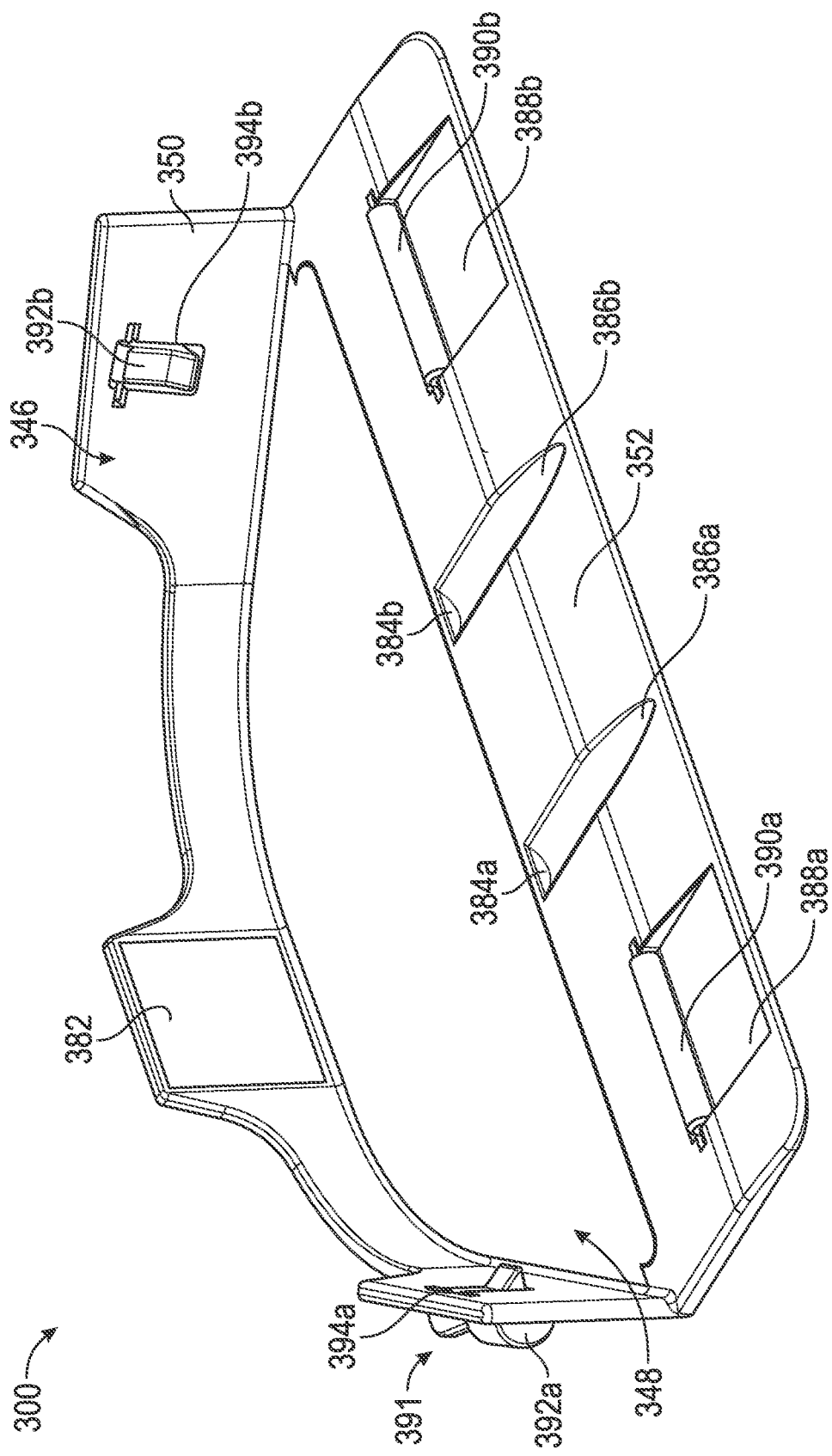
FIG. 10 illustrates an isometric view of a docking station.

FIG. 10 illustrates an isometric view of the docking station 300. FIG. 10 also shows orientation indicators Front and Rear. The docking station 300 of FIG. 10 can be consistent with the docking station 300 discussed above. FIG. 10 shows additional details of the docking station 300.

For example, FIG. 10 shows that the docking station 300 can include fiducials. Each of the fiducial can be a visual indicator such as a bar code, quick response (QR) code, April tag, or the like. A fiducial 382 can be connected to the outer wall 350 and can face a front portion of the docking station 300. The docking station 300 can also include fiducials 384a and 384b that can be located in notches 386a and 386b, respectively, and can face a front portion of the docking station 300. The notches 386a and 386b can allow the robot 100 (or the mobile cleaning robot 600 or other mobile cleaning robot) to identify the fiducials 384a and 384b from in front of the docking station 300. The fiducials 384a and 384b can be out of plane with the fiducial 382 to provide a robot with three dimensional information for docking purposes (e.g., using parallax).

The docking station 300 can also include tracks 388a and 388b in or on the base 348, such as on the platform 352, which can be configured to receive drive wheels (e.g., the drive wheels 618a and 618b) at least partially thereon or therein, respectively. The docking station 300 can also include rollers 390a and 390b, which can be connected to the base 348 such as at a rear end of the tracks 388a and 388b, respectively. The rollers 390a and 390b can be configured to engage the drive wheels when the drive wheels reach respective ends of the tracks 388, such as to limit fore-aft movement of the mobile cleaning robot with respect to the base 348 when the one or more drive wheels engage the base. In other words, rearward movement of the drive wheels (and therefore the mobile cleaning robot) onto the base 348 can be limited through engagement with the rollers 390. Also, engagement of the drive wheels with the rollers 390 can align or orient the robot rotationally (about a vertical axis) on the docking station 300. That is, as the robot backs up and engages the rollers 390, if only one roller is engaged, the robot will rotate as the other drive wheel continues to move until the second roller is engaged, rotating the robot to properly align the robot on the docking station 300. Also, the outer wall 350 can be engageable with the body of the robot to help center (e.g., laterally) or laterally orient the robot on the docking station 300 and to help limit rearward movement of the robot onto the docking station 300.

The docking station 300 can also include a pad engagement system 391 including pawls 392a and 392b that can be connected to the outer wall 350 (or the base 348) such as in openings 394a and 394b of the outer wall 350, respectively. The pawls 392 can be pivotably or rotatably connected to the outer wall 350 and can be engageable with a mopping pad of the robot, such as to help detach a mopping pad from the robot. Further details and operation of the pawls 392 are discussed below.

In operation, the robot 100 can use the fiducials 382 and 384 to identify the docking station 300 and align itself with respect to the docking station 300 for proper docking. For example, the controller 111 of the robot 100 can use the fiducials 382 and 384 to navigate the mobile cleaning robot 100 to dock. However, navigation of the robot 100 onto the docking station 300 is not required. Due to the fiducials and the rollers (and the walls 350, the robot 100 can align itself with the tracks using the fiducials, can rotate 180 degrees and then reverse onto the base 348. The robot can move its drive wheels into the tracks 388 and drive or move at least partially onto the base 348, such as until the robot engages the outer wall 350 or until the drive wheels of the robot engage the rollers 390. Sensors of the robot 100 can confirm that the robot 100 has stopped moving and is in a position 180 degrees from where the alignment with the fiducials occurred, indicating that the robot 100 is properly docked on the docking station 300.

Prior to docking and after docking identification, the robot 100 can determine whether a mopping pad is located on the docking station 300 (e.g., on the base 348), such as using a signal from one or more sensors (e.g., the image capture device 140) and an identification routine (e.g., ODOA). The robot 100 can then decide whether a pad can be dropped off (e.g., when no pad is determined to be on the docking station 300) or when a pad can be picked up (e.g., when a pad is determined to be on the docking station 300).

Once the robot is docked at the docking station 300, the pad engagement system 391 can engage a mopping pad (e.g., the mopping pad 142 or the mopping pad 542) of the mobile cleaning robot to release the mopping pad from the mobile cleaning robot. In the scenario where there is no mopping pad connected to the robot, the robot can collect a mopping pad from the docking station 300. For example, the robot can complete a vacuuming mission (or vacuuming portion of the mission) and then dock on the docking station 300 to attach a mopping pad to the robot. Then, when the robot needs to detach the mopping pad (such as when the mopping mission is complete or when more vacuuming is required), the robot can interact with the docking station 300 to detach the mopping pad. In this way, the docking station 300 can be used by the robot as a pickup and drop off docking station for mopping pads. Further details of the docking station 300 and how the docking station 300 can interact with a robot are discussed below.

Figure 11:
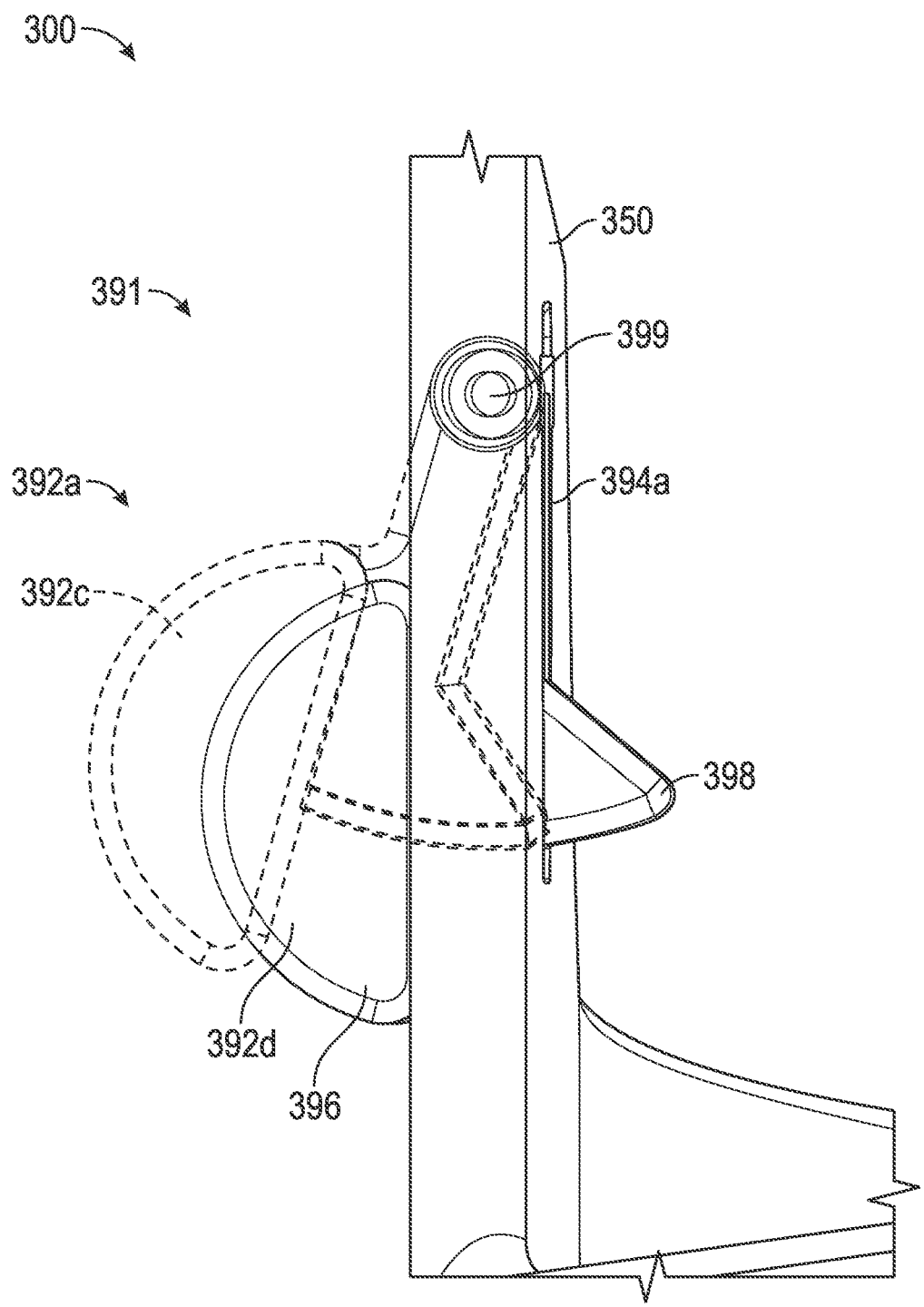
FIG. 11 illustrates an isometric view of a portion of a docking station.

FIG. 11 illustrates an isometric view of a portion of the docking station 300. The docking station 300 can be consistent with the docking station 300 discussed above; FIG. 11 shows additional features of the docking station 300.

For example, FIG. 11 shows that the pawl 392a of the pad engagement system 391 can include a body 396 and a tooth 398. The body 396 can be connected to the outer wall 350 by a pin 399 such as to form a bearing for the pawl 392a, allowing the pawl 392a to rotate with respect to the outer wall 350. As illustrated by 392c (in broken lines), the pawl 392a can rotate away from the outer wall 350 such that the tooth 398 does not extend through the opening 394a. Such rotation can occur when the mobile cleaning robot moves downward with respect to the pad engagement system and when a pad (or other portion of the robot) engages a top surface of the pawl 392 to allow a pad connected to the robot to be lowered past the pawls 392. As illustrated by 392d (in solid lies), the pawl 392a can rotate toward the outer wall 350 such that the tooth 398 extends through the opening 394a, allowing a bottom surface of the tooth 398 of the pawls 392 to engage a pad and separate the pad from the robot.

Dock Operation Examples

Figure 12A:
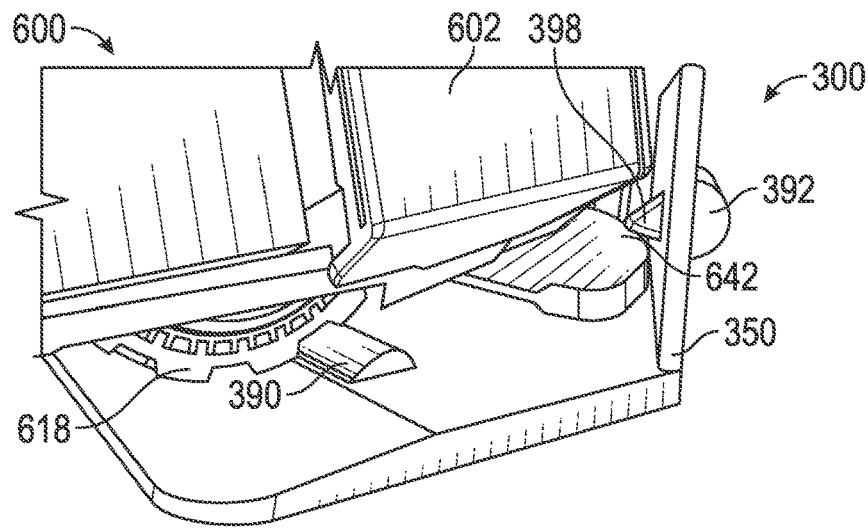
FIG. 12A illustrates a perspective view of a portion of a mobile cleaning robot and a portion of a docking station.
Figure 12B:
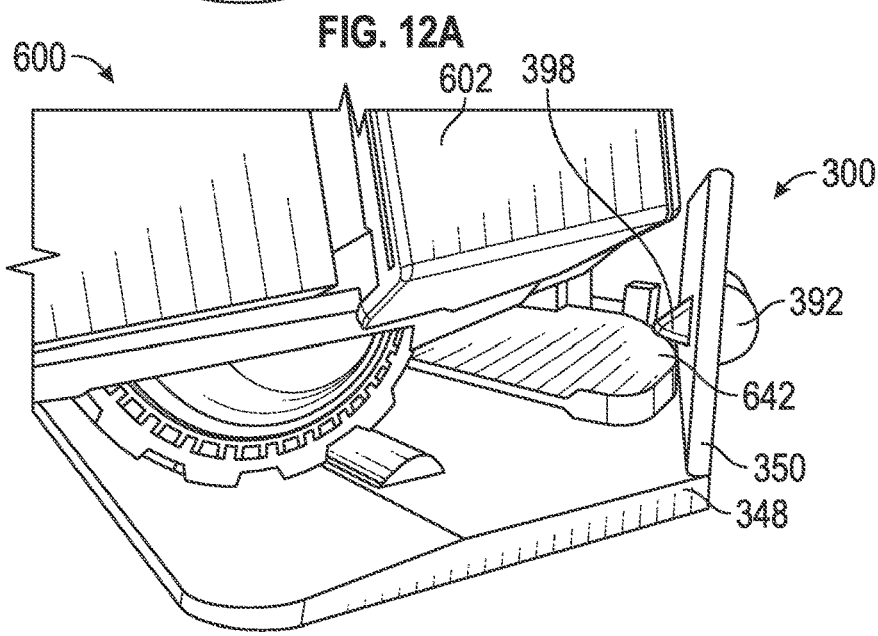
FIG. 12B illustrates a perspective view of a portion of a mobile cleaning robot and a portion of a docking station.
Figure 12C:
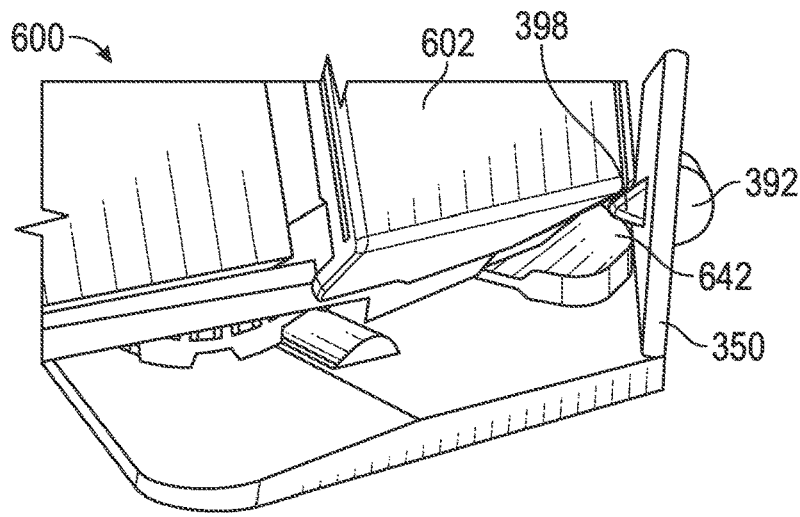
FIG. 12C illustrates a perspective view of a portion of a mobile cleaning robot and a portion of a docking station.

FIG. 12A illustrates a perspective view of a portion of the mobile cleaning robot 600 and a portion of the docking station 300. FIG. 12B illustrates a perspective view of a portion of the mobile cleaning robot 600 and a portion of the docking station 300. FIG. 12C illustrates a perspective view of a portion of the mobile cleaning robot 600 and a portion of the docking station 300. FIG. 12A-12C are discussed together below.

The docking station 300 and the mobile cleaning robot 600 can be consistent with the docking station 300 and the mobile cleaning robot 600 discussed above. FIGS. 12A-12C show how the docking station 300 and mobile cleaning robot 600 can interact. For example, FIG. 12A shows the mobile cleaning robot 600 docked on the docking station 300 with the pad 642 in a lowered position, but high enough such that the pad 642 does not engage the docking station 300 as the mobile cleaning robot 600 docks, to help limit the mobile cleaning robot 600 from pushing the docking station 300 as it docks. In such a position, the drive wheel 618 can be engaged with the roller 390. And, the tooth 398 of the pawl 392 can be positioned between the mopping pad 642 and the body 602. The pawls 392 and the outer wall 350 can be designed or configured such that the tooth 398 inserts between the mopping pad 542 and the body 602 when the mobile cleaning robot 600 docks on the docking station 300 in a mopping configuration (or in another predetermined configuration, such as a docking configuration).

Once the mobile cleaning robot 600 is docked and the tooth 398 is inserted between the mopping pad 642 and the body 602, the docking station 300 can use its active suspension system, such as the actuator system 660 to move to detach the pad 642. For example, a controller (e.g., the controller 111) can operate the actuator system 660 to move the wheel stops 658 to move the drive wheel 618 downward, lifting the body 602. During such movement, the tooth 398 can remain engaged with the pad 642 and the pawls 692 can therefore release the pad 642 from the body 602, such that the pad 642 rests on the base 348, as shown in FIG. 12B. Once the pad 642 is disconnected, the mobile cleaning robot 600 can move forward out of the docking station 300 and continue (or end) its mission.

The docking station 300 can also be used to attach the pad 642 to the mobile cleaning robot 600. For example, as shown in FIG. 12B, the pad 642 can be disconnected from the mobile cleaning robot 600 and resting on the base 348. The mobile cleaning robot 600 can then dock on the docking station 300 with the body 602 above the pad 642. The mobile cleaning robot 600 can then use the active suspension (e.g., the actuator system 660) to move the wheel stops 658 to lower the body 602. When the body 602 is lowered, the pawls 392 can rotate outward, as shown in FIG. 12C, allowing the body to move past the pawls 392. The body 602 can then engage the pad 642 to connect the pad 642 to the body 602, such as through a snap engagement or a magnetic engagement between the body 602 and the pad 642. Once the pad 642 is connected to the body 602, the pad 642 can be raised high enough such that the pad 642 does not engage the docking station 300 as the mobile cleaning robot 600 undocks, to help limit the mobile cleaning robot 600 from moving the docking station 300. Then, the mobile cleaning robot 600 can move forward out of the docking station 300 with the pad 642 connected to perform mopping operations.

When the mobile cleaning robot 600 drops off a cleaning pad, the mobile cleaning robot 600 can be adjusted to a height so that the mobile cleaning robot 600 does not engage the released pad resting on the base 348. In this way, the docking station 300 can be used by the robot as a pickup and drop off docking station for mopping pads.

Docking Station Examples

Figure 13:
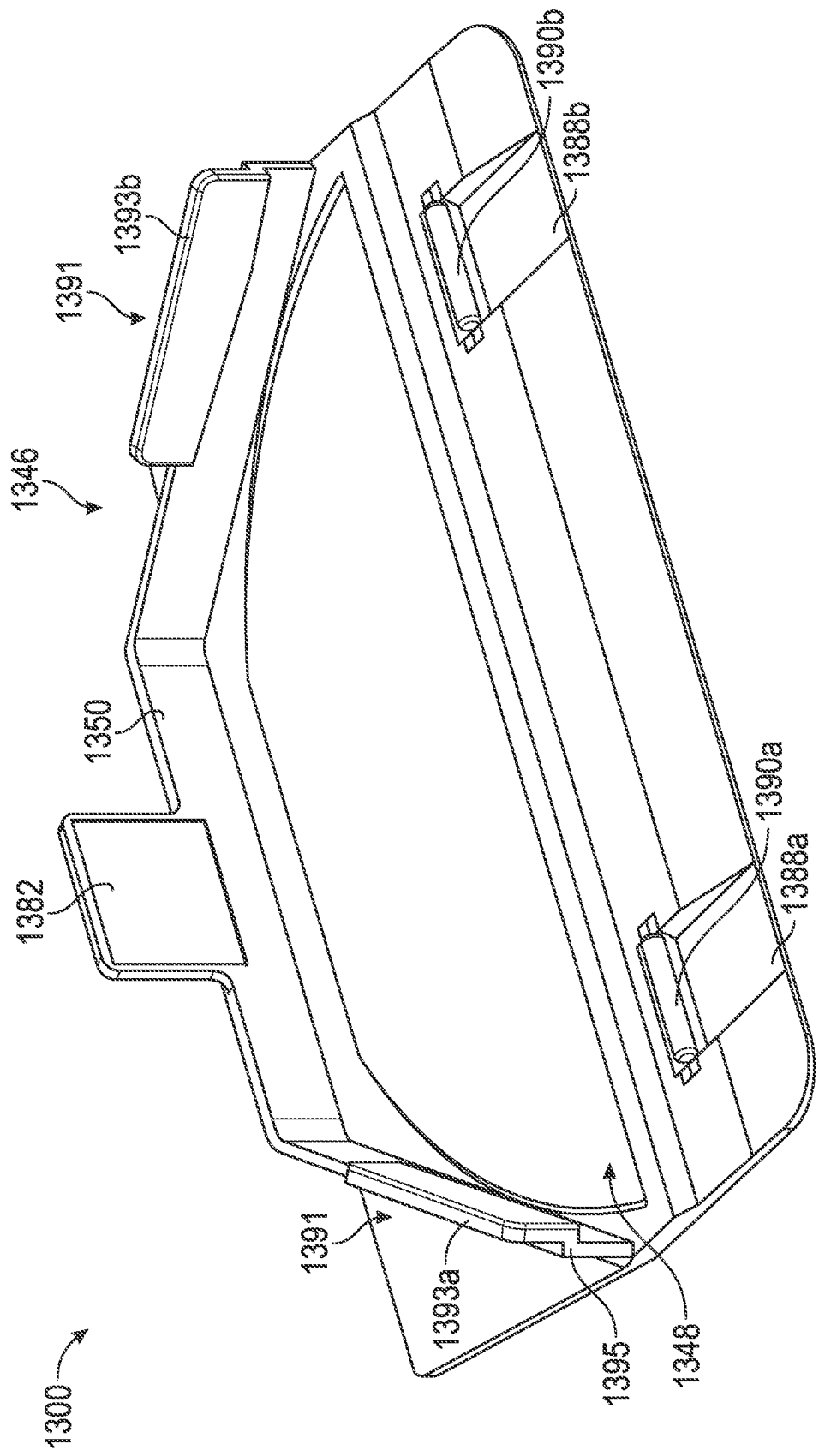
FIG. 13 illustrates an isometric view of a docking station.

FIG. 13 illustrates an isometric view of a docking station 1300. The docking station 1300 can be similar to the docking station 300 discussed above. The docking station 1300 can include a different pad engagement system. Any of the docking stations discussed above or below can include the features of the docking station 1300.

The docking station 1300 can include a base 1348 connected to an upper portion 1346, which can include a wall 1350. The base 1348 can include tracks 1388a and 1388b and rollers 1390a and 1390b. The docking station 1300 can also include one or more fiducials 1382.

The docking station 1300 can also include a pad engagement system 1391 that can include projections 1393a and 1393b or shelves. More specifically, the projections 1393a and 1393b can include a ledge 1395, which can be a lower surface of the projections 1393a or 1393b. The ledge 1395 of the projections 1393a and 1393b can be configured to engage with the pad of a mobile cleaning robot, such as to engage the pad for removal from the robot. Optionally, in this configuration, the pad of the robot can extend beyond a perimeter of a body of the robot to improve engagement between the projections 1393.

Robot Examples

Figure 14:
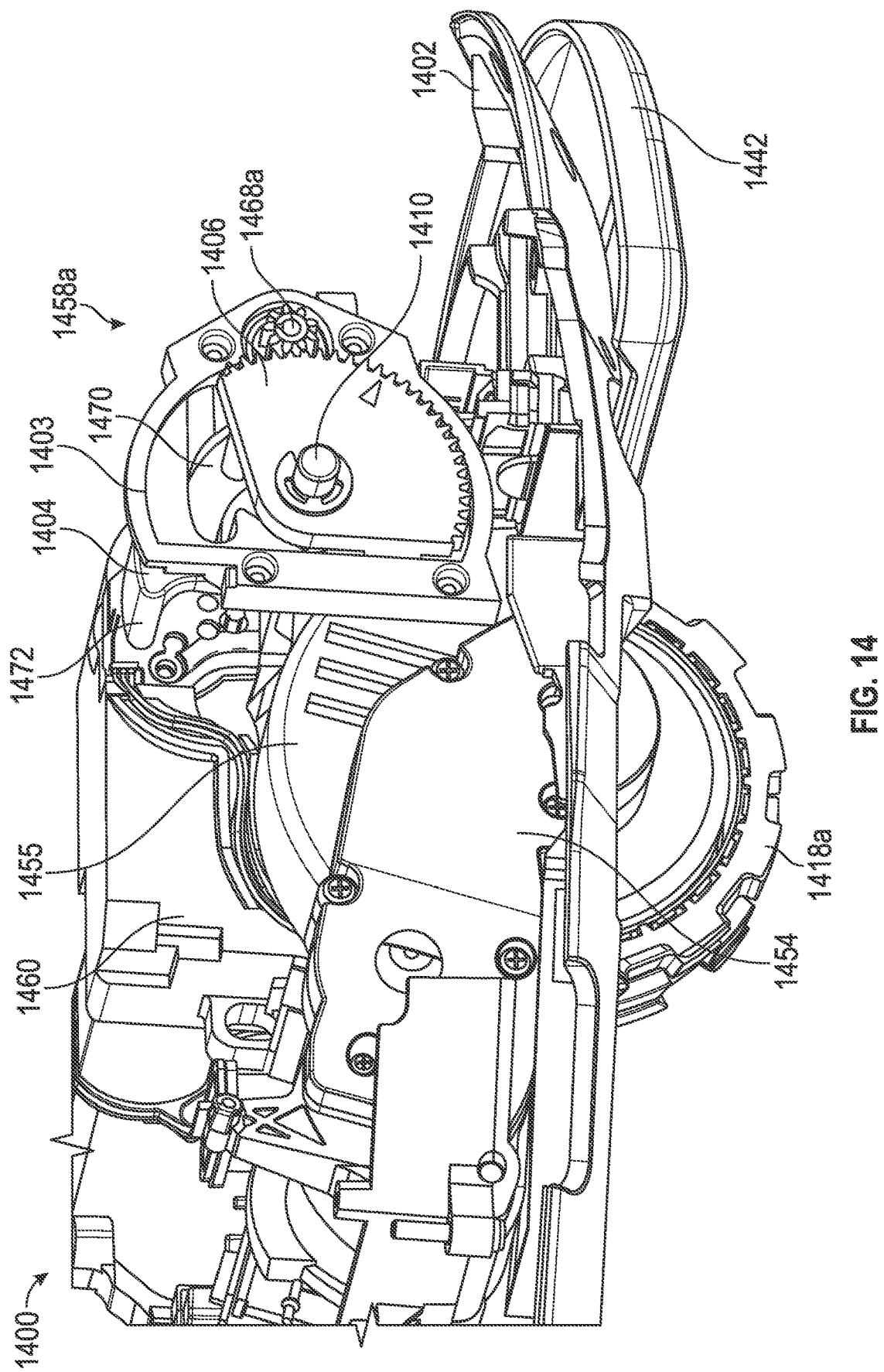
FIG. 14 illustrates an isometric view of a portion of a mobile cleaning robot.
Figure 15:
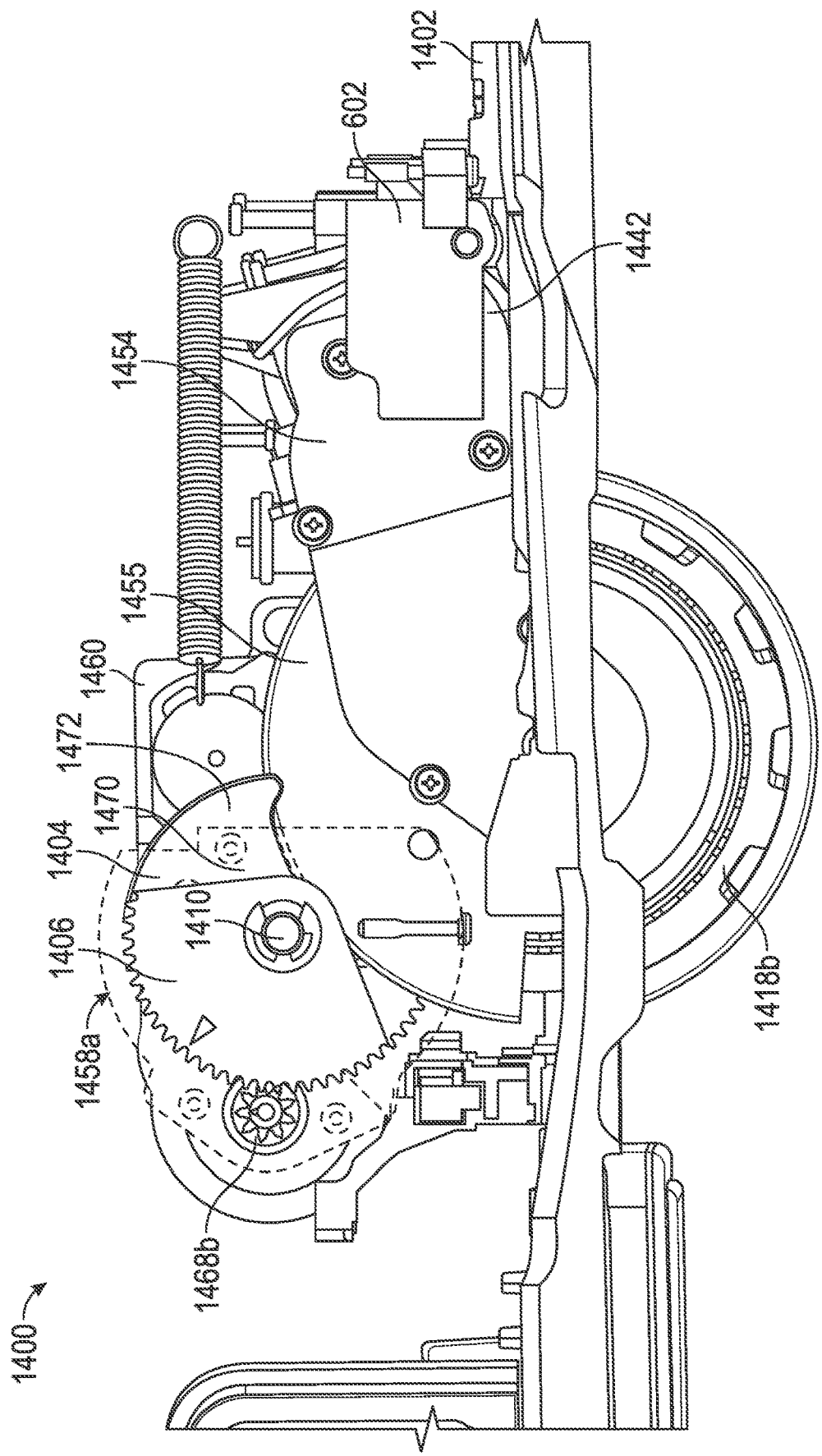
FIG. 15 illustrates an isometric view of a portion of a mobile cleaning robot.

FIG. 14 illustrates an isometric view of a portion of a mobile cleaning robot 1400. FIG. 15 illustrates an isometric view of a portion of the mobile cleaning robot 1400. FIGS. 14 and 15 are discussed together below. The mobile cleaning robot 1400 can be similar to the mobile cleaning robot 600 discussed above; the mobile cleaning robot 1400 can include overload protection. Any of the robots discussed above or below can include the features of the mobile cleaning robot 1400.

The mobile cleaning robot 1400 can include a body 1402 and drive wheels 1418*a* (shown in FIGS. 14) and 1418*b* (shown in FIG. 15). The drive wheels 1418 can be similar to the drive wheels discussed above (e.g., the drive wheels 618) such that the drive wheels 1418 can be connected to the body 1402 and can be configured to move with respect to the body 1402. The mobile cleaning robot 1400 can also include a fender 1455 connected to a drive arm 1454 or the drive wheels 1418.

The mobile cleaning robot 1400 can also include wheel stop assemblies 1458*a* (shown in FIGS. 14) and 1458*b* (shown in FIG. 15). The wheel stop assemblies 1458 can be similar to those discussed above (e.g., the wheel stops 658); the wheel stop assemblies 1458 can include overload protection. More specifically, each of the wheel stop assemblies 1458*a* and 1458*b* can include a housing 1403 (shown in FIG. 14), a stop 1404, a drive gear 1406, and a biasing element 1408 (discussed in FIG. 16). The stop 1404 can include a projection 1472 extending from a body 1470. The stop 1404 can also include a shaft 1410 extending at least partially through the drive gear 1406 and the housing 1403 to enable coaxial or concentric rotation of the stop 1404 and the drive gear 1406.

The housing 1403 can receive at least a portion of the actuator gear 1468 therein to allow the actuator gear 1468 to engage with teeth of the drive gear 1406. The drive gear 1406 can be engaged with the stop 1404 such that rotation of the actuator gear 1468 (such as from an actuator system 1460) can cause rotation of the drive gear 1406 and the stop 1404 to engage the fender 1455 to move the fender 1455 and the drive wheels 1418. Rotation of the actuator gear 1468 in the opposite direction can cause rotation of the stop 1404 and the drive gear 1406 such as to cause the stop 1404 to disengage the fender 1455. The biasing element 1408 can be engaged with the stop 1404 and the drive gear 1406 to operate as an overload protection device, as discussed in further detail below.

Figure 16:
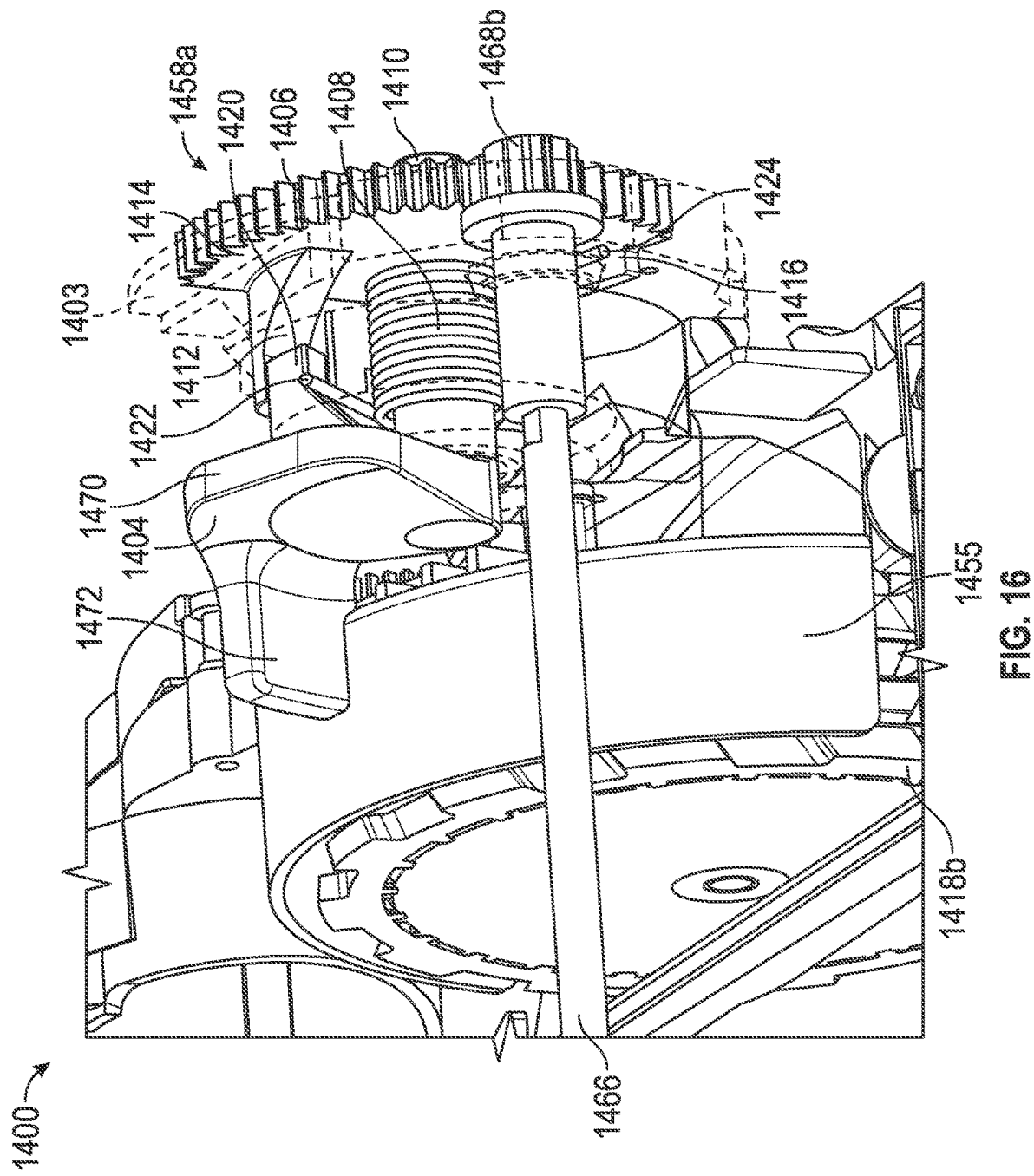
FIG. 16 illustrates an isometric view of a portion of a mobile cleaning robot.

FIG. 16 illustrates an isometric view of a portion of the mobile cleaning robot 1400. The mobile cleaning robot 1400 can be consistent with the mobile cleaning robot 1400 discussed above; FIG. 16 shows additional details of the mobile cleaning robot 1400. For example, FIG. 16 shows the actuator gear 1468 engaged with teeth of the drive gear 1406.

FIG. 16 also shows that the drive gear 1406 can include an engagement portion 1412 extending laterally inward from a body 1414 of the drive gear 1406. The drive gear 1406 can also include a support portion 1416 extending laterally inward from the body 1414 of the drive gear 1406. The stop 1404 can include an engagement portion 1420 extending laterally outward from the body 1470 of the drive gear 1406. The engagement portion 1420 of the stop 1404 can be engageable or engaged with the engagement portion 1412 of the drive gear 1406.

The biasing element 1408 can be a spring, such as a torsion spring, including one or more coils and including legs 1422 and 1424. The leg 1422 can be engaged with the engagement portion 1420 of the stop 1404 and the leg 1424 can be engaged with the support portion 1416 of the drive gear 1406. Because the engagement portion 1412 engages the engagement portion 1420, the stop 1404 can be rotated by the drive gear 1406 away from the fender 1455. And, because the leg 1424 engages the support portion 1416 and the leg 1422 engages the engagement portion 1420, the stop 1404 can be rotated by the drive gear 1406 towards the fender 1455. In this way, the stop 1404 and the drive gear 1406 can operate as a single component in a direction of rotation of the stop 1404 away from the fender 1455.

The stop 1404 and the drive gear 1406 can also operate as a single component in a direction of rotation of the stop 1404 toward the fender 1455 until a force applied by the stop 1404 (such as from the fender 1455) on the leg 1422 overcomes a spring force of the biasing element 1408 at which point the stop 1404 can move relative to the drive gear 1406. In this overload scenario, the stop 1404 can rotate relative to the drive gear 1406 sufficiently far to disengage the projection 1472 from the fender 1455 such as to minimize forces applied to the actuator system 1460 (e.g., via the actuator gear 1468 and a drive shaft 1466), helping to prevent damage to the actuator system 1460 during an overload condition (e.g., a user stepping on the body 1402). When the force applied by the stop 1404 (such as from the fender 1455) on the leg 1422 falls below the spring force, the stop 1404 can be biased by the biasing element 1408 to return to its normal position where the engagement portion 1420 is engaged with the engagement portion 1412. In this way, the stop 1404, drive gear 1406, and biasing element 1408 can provide overload protection for the wheel stop assemblies 1458 helping to limit damage to the wheel stop assemblies 1458 or the actuator system 1460.

Figure 17:
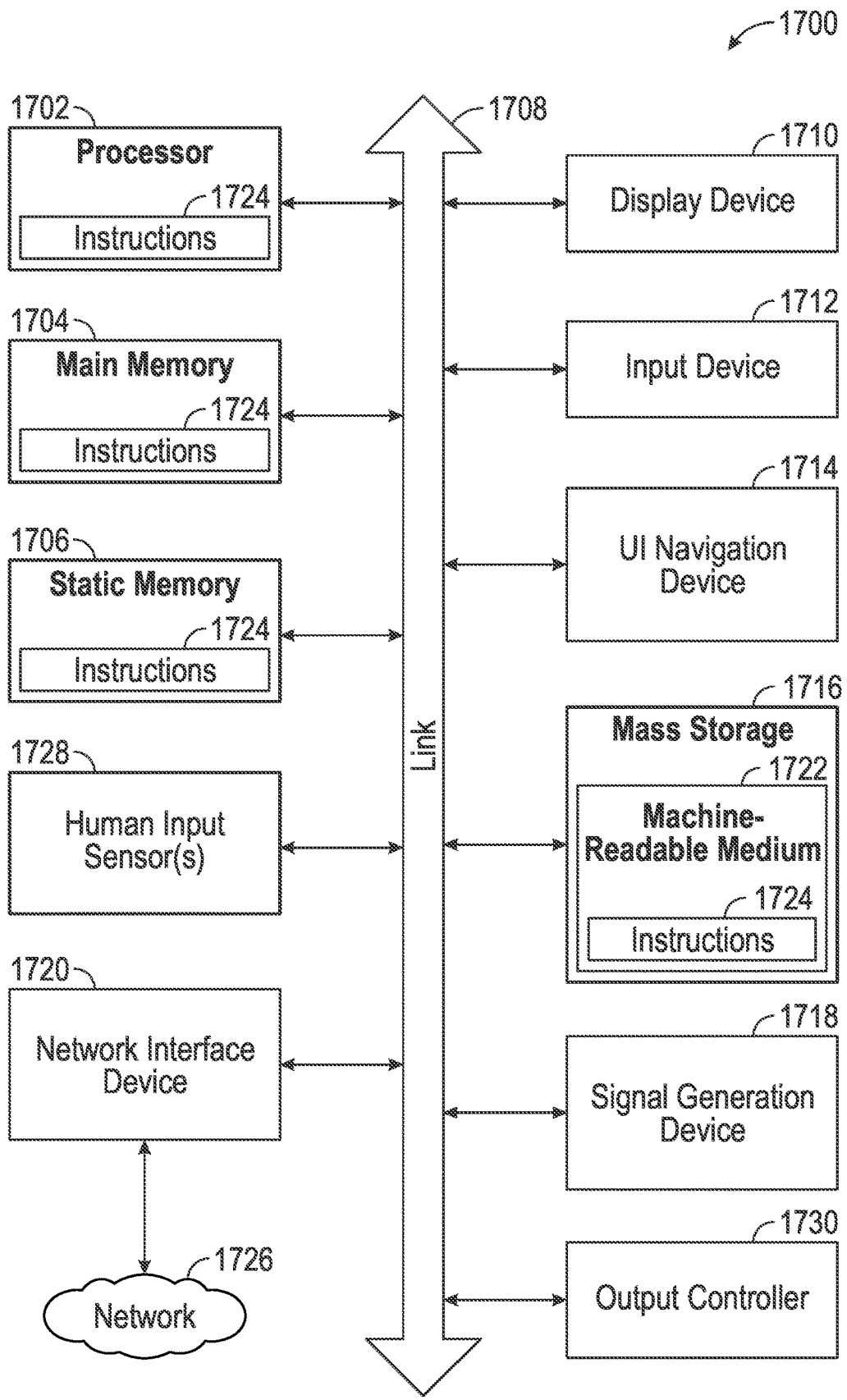
FIG. 17 illustrates a block diagram illustrating an example of a machine upon which one or more embodiments may be implemented.

FIG. 17 illustrates a block diagram of an example machine 1700 upon which any one or more of the techniques (e.g., methodologies) discussed herein can perform. Examples, as described herein, can include, or can operate by, logic or a number of components, or mechanisms in the machine 1700. Circuitry (e.g., processing circuitry) is a collection of circuits implemented in tangible entities of the machine 1700 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 1700 follow.

In alternative embodiments, the machine 1700 can operate as a standalone device or can be connected (e.g., networked) to other machines. In a networked deployment, the machine 1700 can operate in the capacity of a server machine, a client machine, or both in server-client network environments. In an example, the machine 1700 can act as a peer machine in peer-to-peer (P2P) (or other distributed) network environment. The machine 1700 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 1700 can include a hardware processor 1702 (e.g., a central processing unit (CPU), a graphics processing unit (GPU), a hardware processor core, or any combination thereof), a main memory 1704, a static memory (e.g., memory or storage for firmware, microcode, a basic-input-output (BIOS), unified extensible firmware interface (UEFI), etc.) 1706, and mass storage 1708 (e.g., hard drive, tape drive, flash storage, or other block devices) some or all of which can communicate with each other via an interlink (e.g., bus) 1730. The machine 1700 can further include a display unit 1710, an alphanumeric input device 1712 (e.g., a keyboard), and a user interface (UI) navigation device 1714 (e.g., a mouse). In an example, the display unit 1710, input device 1712 and UI navigation device 1714 can be a touch screen display. The machine 1700 can additionally include a storage device (e.g., drive unit) 1708, a signal generation device 1718 (e.g., a speaker), a network interface device 1720, and one or more sensors 1716, such as a global positioning system (GPS) sensor, compass, accelerometer, or other sensor. The machine 1700 can include an output controller 1728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 1702, the main memory 1704, the static memory 1706, or the mass storage 1708 can be, or include, a machine readable medium 1722 on which is stored one or more sets of data structures or instructions 1724 (e.g., software) embodying or utilized by any one or more of the techniques or functions described herein. The instructions 1724 can also reside, completely or at least partially, within any of registers of the processor 1702, the main memory 1704, the static memory 1706, or the mass storage 1708 during execution thereof by the machine 1700. In an example, one or any combination of the hardware processor 1702, the main memory 1704, the static memory 1706, or the mass storage 1708 can constitute the machine readable media 1722. While the machine readable medium 1722 is illustrated as a single medium, the term "machine readable medium" can include a single medium or multiple media (e.g., a centralized or distributed database, and/or associated caches and servers) configured to store the one or more instructions 1724.

The term "machine readable medium" can include any medium that is capable of storing, encoding, or carrying instructions for execution by the machine 1700 and that cause the machine 1700 to perform any one or more of the techniques of the present disclosure, or that is capable of storing, encoding or carrying data structures used by or associated with such instructions. Non-limiting machine readable medium examples can include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1724 can be further transmitted or received over a communications network 1726 using a transmission medium via the network interface device 1720 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1720 can include one or more physical jacks (e.g., Ethernet, coaxial, or phone jacks) or one or more antennas to connect to the communications network 1726. In an example, the network interface device 1720 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1700, and includes digital or analog communications signals or other intangible medium to facilitate communication of such software. A transmission medium is a machine readable medium.

NOTES AND EXAMPLES

The following, non-limiting examples, detail certain aspects of the present subject matter to solve the challenges and provide the benefits discussed herein, among others.

Example 1 is a mobile cleaning robot comprising: a body; a drive wheel connected to the body and operable to move the mobile cleaning robot about an environment; a wheel stop movable with respect to the body; and an actuator system operable to move the wheel stop to engage the drive wheel to extend the drive wheel from the body.

In Example 2, the subject matter of Example 1 optionally includes wherein the actuator system is operable to rotate the wheel stop with respect to the body.

In Example 3, the subject matter of Example 2 optionally includes a fender connected to the drive wheel and at least partially surrounding the drive wheel, the wheel stop engageable with the fender.

In Example 4, the subject matter of Example 3 optionally includes wherein the wheel stop includes a body rotatable with the actuator system and wherein the wheel stop includes a projection extending laterally inward from the body, the projection engageable with the fender.

In Example 5, the subject matter of any one or more of Examples 1-4 optionally include wherein the actuator system is operable to change a mode of the mobile cleaning robot between a vacuuming mode and a mopping mode.

In Example 6, the subject matter of any one or more of Examples 1-5 optionally include a mopping pad assembly releasably connectable to the body.

In Example 7, the subject matter of any one or more of Examples 1-6 optionally include a sensor system connected to the body; and controller circuitry configured to operate the actuator system based on one or more signals from the sensor system.

In Example 8, the subject matter of Example 7 optionally includes wherein the sensor system includes an image capture sensor configured to generate an image capture signal, and wherein the controller is configured to determine a flooring type of a portion of the environment based on the image capture signal, and wherein the controller is configured to operate the actuator system based on the determined flooring type.

In Example 9, the subject matter of any one or more of Examples 1-8 optionally include wherein the actuator system includes a drive gear engageable with the wheel stop to move the wheel stop with respect to the body.

In Example 10, the subject matter of Example 9 optionally includes wherein the actuator system includes an overload spring engaged with the drive gear and the wheel stop, the overload spring configured to allow the wheel stop to move independently of the drive gear when a force applied by the wheel stop on the drive gear exceeds a threshold force.

Example 11 is a docking station for a mobile cleaning robot comprising: a base configured to receive the mobile cleaning robot at least partially thereon, and the base configured to receive a mopping pad at least partially thereon; a one or more walls connected to the base and extending therefrom; and a pad engagement system connected to the one or more walls and engageable with a mopping pad of the mobile cleaning robot to release the mopping pad from the mobile cleaning robot.

In Example 12, the subject matter of Example 11 optionally includes wherein the pad engagement system include a pawl connected to the base or the one or more walls, the pawl engageable with the mopping pad of the mobile cleaning robot to release the mopping pad from the mobile cleaning robot when the mobile cleaning robot moves upward with respect to the pad engagement system when the mobile cleaning robot is located at least partially on the base.

In Example 13, the subject matter of Example 12 optionally includes wherein the mobile cleaning robot is engageable with the pawl to cause the pawl to rotate with respect to the base when the mobile cleaning robot moves downward with respect to the pad engagement system when the mobile cleaning robot is located at least partially on the base.

In Example 14, the subject matter of any one or more of Examples 11-13 optionally include a first fiducial connected to the one or more walls; and a second fiducial and a third fiducial connected to the base.

In Example 15, the subject matter of any one or more of Examples 11-14 optionally include wherein the one or more walls are engageable with the mobile cleaning robot to laterally orient the mobile cleaning robot on the docking station.

In Example 16, the subject matter of any one or more of Examples 11-15 optionally include one or more rollers engageable with one or more drive wheels of the mobile cleaning robot to limit fore-aft movement of the mobile cleaning robot with respect to the base when the one or more drive wheels engage the base.

Example 17 is a mobile cleaning robot system comprising: a mobile cleaning robot comprising: a body; a mopping pad releasably connectable to the body; a pair of drive wheels connected to the body and operable to move the mobile cleaning robot about an environment; and an active suspension system operable to move the body with respect to the pair of drive wheels; a docking station comprising: a base configured to receive the mobile cleaning robot at least partially thereon; a wall connected to the base and extending therefrom; and a pad engagement system connected to the wall and engageable with the mopping pad to release the mopping pad from the mobile cleaning robot.

In Example 18, the subject matter of Example 17 optionally includes the active suspension system comprising: a pair of wheel stops movable with respect to the body; and an actuator system operable to move the pair of wheel stops to engage the pair of drive wheels, respectively, to: 1—limit vertical travel of the drive wheel with respect to the body, and 2—move the drive wheel with respect to the body.

In Example 19, the subject matter of Example 18 optionally includes a sensor system connected to the body; and a controller configured to operate the actuator system based on one or more signals from the sensor system.

In Example 20, the subject matter of Example 19 optionally includes wherein the sensor system includes an image capture sensor configured to generate an image capture signal, and wherein the controller is configured to determine a flooring type of a portion of the environment based on the image capture signal, and wherein the controller is configured to operate the actuator based on the determined flooring type.

In Example 21, the subject matter of Example 20 optionally includes a first fiducial connected to the wall; and a second fiducial and a third fiducial connected to the base, the controller configured to navigate the mobile cleaning robot to dock on the base using the first fiducial, the second fiducial, and the third fiducial.

In Example 22, the subject matter of any one or more of Examples 17-21 optionally include wherein the pad engagement system include a pawl connected to the wall, the pawl engageable with the mopping pad of the mobile cleaning robot to release the mopping pad from the mobile cleaning robot when the mobile cleaning robot moves upward with respect to the pad engagement system when the mobile cleaning robot is located at least partially on the base.

In Example 23, the apparatuses or method of any one or any combination of Examples 1-22 can optionally be configured such that all elements or options recited are available to use or select from.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is provided to comply with 37 C.F.R. § 1.72 (b), to allow the reader to quickly ascertain the nature of the technical disclosure. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A mobile cleaning robot comprising:
   a body;
   a drive wheel connected to the body and operable to move the mobile cleaning robot about an environment;
   a wheel stop rotatable with respect to the body;
   a fender connected to the drive wheel and at least partially surrounding the drive wheel, the wheel stop engageable with the fender; and
   an actuator system operable to rotate the wheel stop to engage the fender to extend the drive wheel from the body.

2. The mobile cleaning robot of claim 1, wherein the wheel stop includes a body rotatable with the actuator system and wherein the wheel stop includes a projection extending laterally inward from the body, the projection engageable with the fender.

3. The mobile cleaning robot of claim 1, wherein the actuator system is operable to change a mode of the mobile cleaning robot between a vacuuming mode and a mopping mode.

4. The mobile cleaning robot of claim 1, comprising:
   a mopping pad assembly releasably connectable to the body.

5. The mobile cleaning robot of claim 1, comprising:
   a sensor system connected to the body; and
   controller circuitry configured to operate the actuator system based on one or more signals from the sensor system.

6. The mobile cleaning robot of claim 5, wherein the sensor system includes an image capture sensor configured to generate an image capture signal, and wherein the controller is configured to determine a flooring type of a portion of the environment based on the image capture signal, and wherein the controller is configured to operate the actuator system based on the determined flooring type.

7. The mobile cleaning robot of claim 1, wherein the actuator system includes a drive gear engageable with the wheel stop to move the wheel stop with respect to the body.

8. The mobile cleaning robot of claim 7, wherein the actuator system includes an overload spring engaged with the drive gear and the wheel stop, the overload spring configured to allow the wheel stop to move independently of the drive gear when a force applied by the wheel stop on the drive gear exceeds a threshold force.

9. A docking station for a mobile cleaning robot, the docking station comprising:
   a base configured to receive the mobile cleaning robot at least partially thereon, and the base configured to receive a mopping pad of a mobile cleaning robot at least partially thereon;
   a one or more walls connected to the base and extending therefrom; and
   a pad engagement system connected to the one or more walls and engageable with the mopping pad of the mobile cleaning robot to release the mopping pad from the mobile cleaning robot.

10. The docking station of claim 9, wherein the pad engagement system include a pawl connected to the base or the one or more walls, the pawl engageable with the mopping pad of the mobile cleaning robot to release the mopping pad from the mobile cleaning robot when the mobile cleaning robot moves upward with respect to the pad engagement system when the mobile cleaning robot is located at least partially on the base.

11. The docking station of claim 10, wherein the pawl of the pad engagement system is engageable with the mobile cleaning robot to cause the pawl to rotate with respect to the base when the mobile cleaning robot moves downward with respect to the pad engagement system when the mobile cleaning robot is located at least partially on the base.

12. The docking station of claim 9, further comprising:
   a first fiducial connected to the one or more walls; and
   a second fiducial and a third fiducial connected to the base.

13. The docking station of claim 9, wherein the one or more walls are engageable with the mobile cleaning robot to laterally orient the mobile cleaning robot on the docking station.

14. The docking station of claim 9, further comprising:
   one or more rollers connected to the base, the one or more rollers engageable with one or more drive wheels of the mobile cleaning robot to limit fore-aft movement of the mobile cleaning robot with respect to the base when the one or more drive wheels engage the base.

15. A mobile cleaning robot system comprising:
   a mobile cleaning robot comprising:
   a body;

a mopping pad releasably connectable to the body;

a pair of drive wheels connected to the body and operable to move the mobile cleaning robot about an environment; and an active suspension system operable to move the body with respect to the pair of drive wheels;

a docking station comprising:

a base configured to receive the mobile cleaning robot at least partially thereon;

a wall connected to the base and extending therefrom; and a pad engagement system connected to the wall and engageable with the mopping pad to release the mopping pad from the mobile cleaning robot.

16. The mobile cleaning robot system of claim 15, the active suspension system comprising:

a pair of wheel stops movable with respect to the body; and an actuator system operable to move the pair of wheel stops to engage the pair of drive wheels, respectively, to: 1—limit vertical travel of the pair of drive wheels with respect to the body, and 2—move the pair of drive wheels with respect to the body.

17. The mobile cleaning robot system of claim 16, comprising:

a sensor system connected to the body; and a controller configured to operate the actuator system based on one or more signals from the sensor system.

18. The mobile cleaning robot system of claim 17, wherein the sensor system includes an image capture sensor configured to generate an image capture signal, and wherein the controller is configured to determine a flooring type of a portion of the environment based on the image capture signal, and wherein the controller is configured to operate the actuator system based on the determined flooring type.

19. The mobile cleaning robot of claim 18, further comprising:

a first fiducial connected to the wall; and a second fiducial and a third fiducial connected to the base, the controller configured to navigate the mobile cleaning robot to dock on the base using the first fiducial, the second fiducial, and the third fiducial.

20. The mobile cleaning robot system of claim 15, wherein the pad engagement system include a pawl connected to the wall, the pawl engageable with the mopping pad of the mobile cleaning robot to release the mopping pad from the mobile cleaning robot when the mobile cleaning robot moves upward with respect to the pad engagement system when the mobile cleaning robot is located at least partially on the base.

* * * * *